(12) United States Patent
Xu

(10) Patent No.: US 10,787,746 B2
(45) Date of Patent: Sep. 29, 2020

(54) GRAPHENE OXIDE PREPARED BY ELECTROCHEMICALLY OXIDIZING AND CUTTING END FACE OF CARBON-BASED THREE-DIMENSIONAL MATERIAL AND METHOD THEREFOR

(71) Applicant: Haibo Xu, Qingdao (CN)

(72) Inventor: Haibo Xu, Qingdao (CN)

( * ) Notice: Subject to any disclaimer, the term of this patent is extended or adjusted under 35 U.S.C. 154(b) by 595 days.

(21) Appl. No.: 15/518,227

(22) PCT Filed: Sep. 14, 2015

(86) PCT No.: PCT/CN2015/089495
§ 371 (c)(1),
(2) Date: Apr. 10, 2017

(87) PCT Pub. No.: WO2016/058466
PCT Pub. Date: Apr. 21, 2016

(65) Prior Publication Data
US 2017/0314141 A1    Nov. 2, 2017

(30) Foreign Application Priority Data
Jun. 29, 2015 (CN) .......................... 2015 1 0364297

(51) Int. Cl.
*C25B 1/00* (2006.01)
*B82Y 40/00* (2011.01)
(Continued)

(52) U.S. Cl.
CPC .................. *C25B 1/00* (2013.01); *B82B 3/00* (2013.01); *B82B 3/0009* (2013.01); *B82Y 40/00* (2013.01);
(Continued)

(58) Field of Classification Search
CPC ........... C25B 1/00; C25B 15/08; C25B 15/02; C25B 11/12; C25B 11/02; C25B 5/00;
(Continued)

(56) References Cited

U.S. PATENT DOCUMENTS 7,658,901 B2     2/2010   Prud'Homme et al.
2009/0110627 A1  4/2009   Choi et al.
(Continued)

FOREIGN PATENT DOCUMENTS

CN     101634032 A     1/2010
CN     102208755 A    10/2011
(Continued)

OTHER PUBLICATIONS

First Office Action dated Jul. 29, 2019 for counterpart European Patent Application No. 15850068.6, 14 pages.
(Continued)

*Primary Examiner* — Arun S Phasge
(74) *Attorney, Agent, or Firm* — Loza & Loza, LLP; Michael F. Fedrick

(57) ABSTRACT

The present invention relates to a method for preparing graphene oxide by cutting an end face of a 3-dimensional carbon-based material by electrochemical oxidation and the graphene oxide prepared by the method. The method comprises connecting a piece of a 3-dimensional carbon-based material as an electrode and another piece of a 3-dimensional carbon-based material or inert material as another electrode to the two electrodes of a DC power supply. A working face of one piece of 3-dimensional carbon-based material contacts the surface of an electrolyte solution, and the two pieces are electrified for electrolysis, during which the working face is between -5 mm below and 5 mm above the surface of the electrolyte solution. The graphite lamella on the end face of one piece of the 3 dimensional carbon- (Continued)

based material used as an electrode is expansion-exfoliated and cut into graphene oxide by electrochemical oxidation, to obtain a graphene oxide-containing electrolyte solution.

15 Claims, 10 Drawing Sheets

(51) Int. Cl.
| | |
|---|---|
| *B82B 3/00* | (2006.01) |
| *C01B 32/19* | (2017.01) |
| *C01B 32/23* | (2017.01) |
| *C01B 32/182* | (2017.01) |
| *C01B 32/198* | (2017.01) |

(52) U.S. Cl.
CPC ............ *C01B 32/182* (2017.08); *C01B 32/19* (2017.08); *C01B 32/198* (2017.08); *C01B 32/23* (2017.08)

(58) Field of Classification Search
CPC ....... C01B 32/182; C01B 32/23; C01B 32/19; C01B 32/198; B82B 3/00; B82B 3/0009; B82Y 40/00; C09K 11/65
See application file for complete search history.

(56) References Cited

U.S. PATENT DOCUMENTS

| | | | |
|---|---|---|---|
| 2013/0102084 A1 | 4/2013 | Loh et al. | |
| 2014/0216944 A1* | 8/2014 | Wei ........................ | C25B 1/00 205/555 |

FOREIGN PATENT DOCUMENTS

| | | | |
|---|---|---|---|
| CN | 102336404 A | 2/2012 | |
| CN | 102534642 A | 7/2012 | |
| CN | 102616774 A | 8/2012 | |
| CN | 102660270 A | 9/2012 | |
| CN | 102807213 A | 12/2012 | |
| CN | 102963887 A | 3/2013 | |
| CN | 103025655 A | 4/2013 | |
| CN | 103058174 A | 4/2013 | |
| CN | 103072980 A | 5/2013 | |
| CN | 103204494 A | 7/2013 | |
| CN | 103265020 A | 8/2013 | |
| CN | 103320125 A | 9/2013 | |
| CN | 103395780 A | 11/2013 | |
| CN | 103451670 A | 12/2013 | |
| CN | 103935998 A | 7/2014 | |
| CN | 103935999 A | 7/2014 | |
| CN | 103991862 A | 8/2014 | |
| CN | 104003379 A | 8/2014 | |
| JP | H05307957 A | 11/1993 | |
| WO | 2014/081117 | 5/2014 | |

OTHER PUBLICATIONS

Chinese Patent application No. 201510364297.4, Office Action (dated Aug. 10, 2017).
European Patent Application No. 15850068.6, Partial Supp. EP Search Report (dated Sep. 1, 2017).
Liu et al, "A green approach to the synthesis of high-quality grapheme oxide flakes via electrochemical exfoliation of pencil core." RSC Advances : An International Journal to Further the Chemical Sciences, vol. 3, No. 29, Apr. 23, 2013 (Apr. 23, 2013), p. 11745, XP055399799.
Abdelkader et al. "High-yield electro-oxidative preparation of graphene oxide". Chemical Communications-Hemcom., vol. 50, No. 61, Jun. 12, 2014(Jun. 12, 2014), pp. 8402-8404, XP055399879.
You et al, "An Electrochemical Route to Graphene Oxide." Journal of Nanoscience and Nanotechnology, vol. 11, No. 7, Jul. 1, 2011(Jul. 1, 2011), pp. 5965-5968, XP055399903.
Thanh et al, "Plasma electrolysis allows the facile and efficient production of graphite oxide from recycled graphite." RSC ADVANCES, vol. 3, No. 38, Jul. 23, 2013(Jul. 23, 2013), p. 17402, XP055399880.
Thanh et al, "Plasma-assisted electrochemical exfoliation of graphite for rapid production of graphene sheets." RSC Advances: An International Journal to Further the Chemical Sciences, vol. 4, No. 14, Jan. 6, 2014(Jan. 6, 2014), p. 6946, XP055399792.
Second Office Action dated Apr. 29, 2019 for counterpart Korean patent application No. 10-2017-7009296, 9 pages.
Decision of Refusal issued for corresponding Japanese Patent Application 2017-538283 dated Apr. 23, 2019.
Second Office Action and translation for counterpart Chinese patent application No. 201510364297.4, dated May 11, 2017; 8 pages.
First Office Action issued for corresponding Japanese Patent Application 2017-538283 dated Jul. 31, 2018.
First Office Action and search report dated Apr. 12, 2017 for counterpart Chinese patent application No. 201510364297.4, along with the English translation; 12 pages.
First Office Action and search report dated Mar. 28, 2017 for counterpart Chinese patent application No. 201410538019.1, along with the English translation; 12 pages.
International search report issued for counterpart Chinese patent application No. PCT/CN2015/089495 dated Dec. 18, 2015; 2 pages.
Li et al, "Nitrogen-Doped Graphene Quantum Dots with Oxygen-Rich Functional Groups"; Journal of the American Chemical Society, vol. 134, pp. 15-18; 4 pages.
Fu He, "Carbon Fiber and Graphite Fiber", Chemical Industry Press, Beijing, 2010; 6 pages.
Shinde et al, "Electrochemical preparation of luminescent graphene quantum dots from multiwalled carbon nanotubes", Chem. Eur. J, 2012; DOI 10.1002/chen.201201043; 7 pages.
Zhang et al, "Facile synthesis of water-soluble, highly fluorescent graphene quantum dots as a robust biological label for stem cells", J. Mater. Chem., 2012, 22, 7461; DOI 10.1039/C2JM16835A; 8 pages.
Barreiro et al, "Graphene quantum dots at room temperature carved out from few-layer graphene", Nano Letter, 2012; 21 pages.
Peng et al, "Graphene quantum dots derived from carbon fibers", Nano Letter, 2012, 12, 844-849; dx.doi.org/10.1021/nl2038979; 6 pages.
Dong et al, "One-step and high-yield simultaneous preparation of single- and multi-layer graphene quantum dots from CX-72 carbon black", J. Mater. Chem., 2012; 6 pages.
Decision of Rejection dated Sep. 25, 2019 for counterpart Korean Patent Application No. 10-2017-7009296, along with the English translation, 7 pages.
Korean Office Action for Korean Application No. 10-2017-7009296 dated Oct. 5, 2018, 11 pages.
Extended European Search Report dated Feb. 2, 2018 for counterpart European Patent Application No. 15850068.6.

\* cited by examiner

GRAPHENE OXIDE PREPARED BY ELECTROCHEMICALLY OXIDIZING AND CUTTING END FACE OF CARBON-BASED THREE-DIMENSIONAL MATERIAL AND METHOD THEREFOR

Cross-Reference to Related Applications

This application is the U.S. national stage of International Patent Application No. PCT/CN2015/089495, filed on Sept. 14, 2015, which claims the benefit of priority under 35 U.S.C. §119 from Chinese Patent Application No. 201410538019.1, filed on Oct. 13, 2014, and from Chinese Patent Application No. 201510364297.4, filed on Jun. 29, 2015. The disclosures of the foregoing applications are incorporated herein by reference in their entirety.

TECHNICAL FIELD

Embodiments of the present invention belong in the field of nanomaterial, and in particular relate to a method for preparing graphene oxide by cutting an end face of a 3-dimensional carbon-based material by electrochemical oxidation, and to the graphene oxide produced by the method. More particularly, embodiments of the present invention relate to a method for preparing quantum dots of graphene (oxide) by cutting a tip face of a carbon fiber by electrochemical oxidation, to obtain a series of graphene (oxide) quantum dots having various nano-scale sizes, carbon/oxygen ratios, and characteristics.

BACKGROUND ART

Graphene is a 2-dimensional (2D) hexagonal planar monolayer of carbon atoms packed in a honeycomb lattice pattern via $sp^2$ orbital hybridization, and is the fundamental building block of all graphite-based materials of other dimensions. Graphene can be assembled into the 0-dimensional (0D) fullerene, rolled into a 1-dimensional (1D) nanotube, or stacked into the 3-dimensional (3D) graphite. Graphene is currently the thinnest and hardest nanomaterial in the world. It is nearly completely transparent absorbing only 2.3% of light; has a coefficient of thermal conductivity as high as 5300 W/m·K, higher than that of carbon nanotubes and diamond; has an electron mobility at room temperature greater than 15,000 $cm^2$/V·s, much higher than that of carbon nanotubes or crystalline silicon; and has a resistivity of only $10^{-6}$ Ω·cm, a material of the lowest resistivity currently known in the world, lower than that of copper or silver. Due to its very low resistivity, graphene shows an extremely rapid electron transfer speed, and thus has been expected for the development of next-generation electronic components or transistors exhibiting a faster conductive rate. Graphene is actually a transparent good conductor, very suitable for the manufacture of transparent touchscreens, light plates, and even solar cells. Another important feature of graphene lies in that a quantum Hall effect can be observed at room temperature, and therefore in-depth research thereof has special significance for the development of future electronic devices and manufacture of low-energy consuming high-speed electronic devices.

Graphene oxide is an oxide of graphene, and is one-atom thick like graphene, but has a large number of other heteroatom-containing functional groups at the basal plane and/or edges of the carbon structure. According to the 2D size of the carbon basal plane, graphene oxide may be classified into graphene oxide quantum dots of 1 to 100 nm, and graphene oxide microplatelets greater than 100 nm. Graphene oxide structures that are 2- to 10-monolayer thick are called few-layer graphene oxide quantum dots or microplatelets; and those being 11- to 100-monolayer thick are called multi-layer graphene oxide quantum dots or microplatelets. For clarity, they are generally called graphene oxide herein, unless particularly indicated otherwise.

Graphene oxide is a new carbon-based material having excellent performances with a high specific area and abundant surface functional groups. Graphene oxide microplatelets may be regarded as an unconventional soft material, having features of a polymer, a colloid, a thin film and an amphiphilic molecule. Graphene oxide microplatelets were considered as a hydrophilic substance for a long time, because they are well dispersed in water. However, experiments have shown that graphene oxide microplatelets in fact have amphiphilicity, showing a distribution of hydrophilicity-to-hydrophobicity from the edge to the center of a graphene oxide microplatelet. Therefore, they have been widely used to manufacture graphene oxide microplatelet composite materials, including polymer-based composite materials and inorganic composite materials, showing potential applications in the fields of energy source, electronics, biomedicine, catalysis, and the like.

Graphene quantum dots (GQDs), including graphene oxide quantum dots (GOQDs), are a quasi-zero-dimensional nanomaterial, showing a highly significant quantum confinement effect due to the all-direction restriction to the movement of their internal electrons, and thereby having many distinct properties. As compared with traditional semiconductor quantum dots, the novel GQDs have the following distinctive characteristics: 1) free of highly toxic metal element such as cadmium and lead, being an environmentally friendly quantum dot material; 2) having a very stable structure resistant to strong acids, strong alkalis, and light-induced corrosion (traditional semiconductor quantum dots are easily oxidized when applied in photo- and electro-chemical devices, leading to lowered performance and a shortened working life of the devices); 3) having a thickness as thin as a monolayer, and a reduced lateral dimension as small as the size of a benzene ring, while still having high chemical stability; 4) having an band gap width in principle adjustable within the range of 0 to 5 eV by a quantum confinement effect and a boundary effect, allowing the wavelength range to be extended from the infrared to visible and far-UV region, to satisfy special requirements of various technologies for the energy gap and characteristic wavelength of the material; 5) easy to be functionalized on the surface, stably dispersible in common solvents, and meeting the requirements for low-cost processing of materials. These would bring about revolutionary changes for the fields of electronics, photoelectricity, and electromagnetic. GQDs are applicable in solar cells, electronic devices, optical dyes, biological tags, composite micro-particle systems, etc. GQDs (including GOQDs) have important potential applications in biology, medicine, materials, new semiconductor devices, etc., as they can realize single-molecule sensors, promote supermini-transistors or on-chip communication via semiconductor lasers, or can be used to manufacture chemical sensors, solar cells, medical image devices, nano-electric circuit, or the like.

The current industrialized method for manufacturing graphene oxide is the chemical oxidation method, which mainly utilizes the intrinsic structural defects of graphite to produce, with graphite as the starting material, graphite oxide having an inter-layer distance significantly larger than that in graphite, under the condition of a strong acid (e.g. concentrated sulfuric acid or concentrated nitric acid), a strong oxidant and heating, followed by an effective exfoliating means to obtain monolayer graphene oxide. Preparation of graphite oxide has been reported since as early as 1860, and many different methods were developed by researchers through studies of strong oxidative conditions, mainly including the Brodie method, the Staudenmaier method, and the Hummers method. Nowadays the most commonly used is the improved Hummers method, in which graphite oxide is obtained in two steps, pre-oxidation and oxidation. After graphite oxide is obtained, although the distance between graphite layers have significantly increased due to incorporation of oxygen-containing functional groups, many layers are still bonded together by van der Waals forces, which necessitates application of external force to obtain monolayers of graphene oxide, that is, to eliminate the interlayer action forces via certain exfoliating means. Methods for exfoliating graphite oxide reported so for mainly include thermal expansion, low-temperature exfoliation, ultrasonication dispersion, etc., among which the ultrasonication exfoliation is the most popular due to its advantages in that it is simple to operate, does not cause chemical changes during exfoliation, achieves a high degree of exfoliation, and can substantially control the size and layers of the product by simply controlling the duration and power of ultrasonication.

In terms of size, GQDs (including GOQDs) and microplatelets of graphene and graphene oxide both have a monolayer or few-layer thickness (not more than 10 layers, with each layer being about 0.34 to 0.40 nm thick), but differ from each other in the size of planar orientation; the planar dimension is less than 100 nm for the former, but is of microscale or more for the latter. The difficulty in producing the former lies in how to obtain smaller nanoscale quantum dots, while the difficulty in producing the latter is how to control the number of layers. This leads to great difference in raw material selection and preparation method between them. For example, with respect to the top-down preparation method, in preparation of GQDs (including GOQDs), it is more advantageous to choose a microcrystalline carbon-based material as the raw material. The size of carbon fiber microcrystal is only several tens of nanometers (*Carbon Fiber and Graphite Fiber*, by HE Fu, Chemical Industry Press, Beijing, 2010), and thus it is easy to obtain GQDs by an appropriate dissociation method. The difficulty in preparation thereof lies in how to cut each piece of microcrystal individually out of the bulk phase as much as possible, despite that it is relatively easy to obtain a monolayer size (because the diameter and thickness of microcrystal pieces are only tens of nanometers and have weak inter-layer van der Waals forces). In contrast, in preparation of microplatelets of graphene and graphene oxide, it is more advantageous to choose a highly graphitized carbon-based material having a large lamellar crystalline structure, such as flake graphite. The difficulty in preparation thereof lies in how to cut each lamella individually out of the crystal phase as much as possible (given that large-size graphite crystal has strong inter-layer van der Waals forces), despite that it is relatively easy to obtain plane-oriented large pieces.

Until now many domestic and foreign companies have reported that they can produce graphene oxide in a scale of kilograms or tons. These high-throughput production techniques generally require chemical treatment with strong acids or oxidants to expand graphite to achieve oxidation expansion of graphite, but differ from each other in implementing policy, process step or combination with other techniques, as improved chemical techniques over the Brodie, Staudenmaier, and Hummers methods. The use of a large amount of chemicals like strong acids and strong oxidants causes serious contamination, and results in poor product quality in that the distribution of the number of layers and lamella diameter is too broad and the dispersion stability is poor, directly leading to poor controllability in applications. Furthermore, some conventional electrochemical exfoliation methods have also been used, including those in *Electrochemical preparation of luminescent graphene quantum dots from multiwalled carbon nanotubes* (2012) in Chem. Eur. J., *Facile synthesis of water-soluble, highly fluorescent graphene quantum dots as a robust biological label for stem cells* in J. Mater. Chem., CN102534642A, CN102963887A, CN103451670A, CN102807213A and CN103991862A. Conventional electrochemical preparation methods have issues of the low working current density and uneven current distribution, which result in prolonged processing time, low purity and quality of products, broad distribution of layer number and particle size, necessity of subsequent complicated purification procedures, and a low product yield.

In addition, the top-down preparation methods currently used often produce products of mainly few-layer or multi-layer graphene having a large size (for example the methods described in U.S. Pat. No. 7,658,901, CN103935999A, CN101634032A), while the bottom-up preparation method easily produces a large-size monolayer graphene, such as the CVD method (e.g. the method described in US2009110627A1), but is not easily applied in large-scale production.

Hereinafter, the preparation method of GQDs (including GOQDs) available in the prior art will be described, mainly from a material science point of view, in respect of the top-down and bottom-up approaches.

The top-down method refers to physical or chemical cutting of a large-size graphene flake into small-size GQDs (including GOQDs). CN102660270A discloses a solvothermal method for preparing fluorescent GQDs, wherein graphene oxide is prepared first, and then cut into quantum dots with solvothermal energy. CN102616774A discloses a method for preparing GQDs, wherein an amine-based passivating agent is added during hydrothermal cutting. These two methods are disadvantageous due to release of large heat, high energy consumption, and low yield. CN102336404A discloses a photocatalytic oxidation-based method of preparing GOQDs under ultra-sonication, hydrogen peroxide and a catalyst in combination with UV radiation, which improves the distribution of the quantum dots produced, but it is difficult to apply this method in large-scale production and to control the shape and edge morphology of the quantum dots. In the studies of *Electrochemical preparation of luminescent graphene quantum dots from multiwalled carbon nanotubes* (2012) in Chem. Eur. J. and *Facile synthesis of water-soluble, highly fluorescent graphene quantum dots as a robust biological label for stem cells* in J. Mater. Chem., GQDs having good water solubility were produced by electrochemical exfoliation, but both the pre-treatment of the raw material graphite and the post-production purification procedure took a considerably long time, and the product yield was low. CN102208755A discloses a dry method for preparing GQDs by UV etching, which etches a piece of graphene on a mica slice with UV, to obtain GQDs, but has drawbacks of radiation, huge energy consumption, and low production. *Graphene quantum dots at room temperature carved out from few-layer graphene* published in *Nano Letter* in 2012 produces GQDs from the graphene prepared by electron beam etching. These methods are complex in that they are implemented in several steps including oxidation, reduction, and cutting, have a long-period process and low yield, require harsh conditions, and are not easy to apply widely. CN103265020A discloses a method for preparing a macro amount of GQD powder from natural flake graphite, of which the first step converts natural flake graphite into graphite nanoparticles, the second step converts graphite nanoparticles into primary intercalation nanoscale graphite oxide, the third step places the primary intercalation nanoscale graphite oxide in an unsealed capped crucible and applies heat treatment in air to obtain the GQD powder. The second step of this method requires a large amount of strong acid and strong oxidant, is complex, time consuming, and highly contaminating over the entire process, and has a poor control of the distribution of the particle size and the number of layers. The heat treatment in the third step of this method deteriorates the hydrophilicity of the product. Furthermore, preparation methods using microcrystalline carbon-based materials as the carbon source have also been used. In *Graphene quantum dots derived from carbon fibers* published in *Nano Letter* in 2012, graphite stacked in carbon fibers which are used as the carbon source is exfoliated by acid treatment, and a large number of GQDs having various diameters can be produced in only one step. This method is advantageous in simple operation and cheap raw material, but is disadvantageous in that the preparation process needs a significant amount of sulfuric acid and nitric acid, takes a long time, causes serious contamination, produces a very wide particle-size distribution, and necessitates subsequent separation by dialysis to obtain a smaller particle size, thereby resulting in a low effective yield. In *One-step and high yield simultaneous preparation of single-and multi-layer graphene quantum dots from CX-72 carbon black* published in J. Mater. Chem. in 2012, 30-nm carbon black particles are used as the raw material and refluxed at a high temperature in $HNO_3$ for a long period, followed by centrifuging to obtain GQDs of two sizes. However, since the carbon black raw material has a complex structure with many non-$sp^2$ configurations, the GQDs obtained by this method have many defects and a low quality.

The bottom-up method refers to preparation of GQDs (including GOQDs) through a series of chemical reactions starting from small-molecule precursors. CN103320125A discloses a method for preparing a multi-color fluorescent GQD material, in which grains of pyrene in the selected precursor are oxygen-functionalized on the surface, then subjected to hydrothermal dehydrogenation, allowed to grow, and in situ surface functionalized at a low temperature under the catalysis of hydrazine hydrate and aqueous ammonia. In general, most bottom-up methods show good controllability, but have complicated steps and operations, and are currently not yet suitable for industrial-scale production.

In summary, there is still an urgent demand in the field of nanomaterial to develop a method for preparing high-quality graphene oxide, including high-quality graphene oxide quantum dots.

SUMMARY OF INVENTION

In order to address the above technical problems, one of the present invention's objectives is to provide a method for preparing graphene oxide by cutting an end face of a 3-dimensional carbon-based material by electrochemical oxidation, and to provide the graphene oxide produced by the method. As compared with the traditional chemical oxidation method and electrochemical preparation method, the method for preparing graphene oxide according to the present invention has a higher oxidation expansion-based exfoliating and cutting ability, and can produce high-quality graphene oxide having fewer layers and more uniform particle-size distribution with low energy consumption and no contamination. In some specific embodiments, the method can further produce smaller graphene oxide quantum dots having even fewer layers and even more uniform particle-size distribution, and reduced graphene (including graphene quantum dots and/or graphene microplatelets).

In order to accomplish the above objectives, embodiments of the present invention provide a method for preparing graphene oxide by cutting an end face of a 3-dimensional carbon-based material by electrochemical oxidation, comprising the steps of:

connecting a piece of a 3-dimensional carbon-based material as an electrode and another piece of a 3-dimensional carbon-based material or inert material as another electrode to the two electrodes, i.e. the positive and negative electrodes, of a DC power supply respectively, wherein an end face of at least one piece of a 3-dimensional carbon-based material serves as the working face and is positioned in contact and parallel with the liquid surface of an electrolyte solution;

then electrifying the two pieces for electrolysis, during which the working zone for the end face serving as the working face is located between −5 mm below and 5 mm above the liquid surface of the electrolyte solution (the negative value means below the liquid surface, and the positive value means above the liquid surface and is due to an occurrence of liquid-climbing during working); and intermittently or continuously controlling the end face within the working zone, such that the graphite lamella on the end face of the at least one piece of the 3-dimensional carbon-based material is expansion-exfoliated and cut into graphene oxide by electrochemical oxidation, which is dispersed in the electrolyte solution to obtain a graphene oxide-containing electrolyte solution.

In the above method, preferably, the graphene oxide has a concentration of 0.01 to 100 mg/mL in the graphene oxide-containing electrolyte solution.

In the above method, when an end face of only one piece of the 3-dimensional carbon-based material serves as the working face and is positioned in contact and parallel with the liquid surface of the electrolyte solution, the other piece of a 3-dimensional carbon-based material or inert material is fully or half immersed in the electrolyte solution. The two pieces of the 3-dimensional carbon-based material are of the same or different materials.

In the above method, an end face of one piece of a 3-dimensional carbon-based material and an end face of the other piece of a 3-dimensional carbon-based material may both serve as working faces and be positioned in contact and parallel with the liquid surface of the electrolyte solution, and the two pieces of a 3-dimensional carbon-based material are of the same or different materials.

In the above method, the selected 3-dimensional carbon-based material may be a structured body having a regular shape and containing lamellar structure of graphite, including preferably one of, or a combination of more of, graphite sheets, paper, boards, filaments, tubes, and rods made from natural or artificial graphite, carbon fiber bundles and textures such as carpets, cloth, paper, ropes, boards and tubes woven with carbon fiber bundles.

In the above method, preferably, the end face of a piece of a 3-dimensional carbon-based material which serves as the working face and is positioned in contact and parallel with the liquid surface of the electrolyte solution is a macroscopic surface at an angle of 60° or more (more preferably 60° to 90°) with respect to one of the two-dimensional orientations of the microscopic graphite lamella of the 3-dimensional carbon-based material.

In the above method, preferably, the electrochemical oxidation is implemented in the way that an end face of only one piece of a 3-dimensional carbon-based material either always serves as the anode working face or alternately serves as the anode or cathode working face (while the other piece of a 3-dimensional carbon-based material or inert material as the other electrode is fully or half immersed in the electrolyte solution), the working voltage of the DC power supply during electrolysis is not higher than 80 V, and the working current density with respect to the end face is from +(1 to 300) A/cm$^2$ or ±(1 to 300) A/cm$^2$, wherein the symbol "+" indicates the anode current density, and the symbol "±" indicates the current density of the alternating anode and cathode. During the alternating cycles of electrolysis, the working current densities of the alternating anode and cathode may be the same or different.

In the above method, preferably, the electrochemical oxidation is implemented in the way that an end face of one piece of a 3-dimensional carbon-based material and an end face of the other piece of a 3-dimensional carbon-based material both serve as working faces, and the two end faces each alternately serve as the anode or cathode working face, the working voltage of the DC power supply during electrolysis is not higher than 100 V, and the working current density with respect to each end face is ±(1 to 300) A/cm$^2$, wherein the symbol "±" indicates the current density of the alternating anode and cathode. During the alternating cycles of electrolysis, the working current densities of the alternating anode and cathode may be the same or different.

In an embodiment of the above preparation process, a piece of a 3-dimensional carbon-based material may serve as the anode, another piece of a 3-dimensional carbon-based material or inert material may serve as the cathode, and they are connected respectively to the positive and negative electrodes of a DC power supply. Before electrification, one end face of at least the piece of the 3-dimensional carbon-based material serving as the anode is positioned in contact and parallel with the liquid surface of an electrolyte solution (the error of the end face entering the solution is acceptable within a range not beyond 5 mm relative to the liquid surface). After electrification, under the mechanical action of the surface tension and the bubbles generated on the surface of electrodes, liquid-climbing occurs and allows the end face of the 3-dimensional carbon-based material to also work above the liquid surface of the electrolyte solution before electrification, and the working zone for the end face of the 3-dimensional carbon-based material during electrification is between −5 mm below and 5 mm above the liquid surface of the electrolyte solution. The end face of the 3-dimensional carbon-based material is intermittently or continuously controlled within the above-described working zone due to liquid surface movement upon electrification, such that the microscopic graphite lamella on the end face of the piece of 3-dimensional carbon-based material is expansion-exfoliated and cut into graphene oxide by electrochemical oxidation, which is dispersed in the electrolyte solution. In addition, an end face of one piece of a 3-dimensional carbon-based material and an end face of the other piece of a 3-dimensional carbon-based material may both serve as working faces and be positioned in contact and parallel with the liquid surface of the electrolyte solution, before electrification and reaction. Furthermore, the two pieces as electrodes may exchange their polarity with each other before electrification to react, such that one end face of one piece of a 3-dimensional carbon-based material, or two end faces of both pieces of 3-dimensional carbon-based materials, may alternately work as the anode and cathode working faces.

In the above preparation process, making an end face of one piece of a 3-dimensional carbon-based material alternately work as the anode or cathode working face can achieves a treatment cycle of oxidation, reduction, and re-oxidation of the 3-dimensional carbon-based material, which is advantageous due to the ability to control the degree of oxidation and cutting as compared with the single oxidation process, but is defective in moderate productivity. In order to make up for deficiency, an end face of one piece of a 3-dimensional carbon-based material and an end face of the other piece of a 3-dimensional carbon-based material may be both set as working faces and positioned in contact and parallel with the liquid surface of the electrolyte solution, each alternately working as the anode or cathode working face. This may achieve a treatment cycle of simultaneous oxidation, reduction, and re-oxidation of the 3-dimensional carbon-based materials on both electrodes, which is advantageous due to high productivity as compared to the above oxidation and reduction treatment cycle on a single electrode, but is defective in high energy consumption in production caused by the small working area of both electrodes. More specifically, when an end face of a piece of a 3-dimensional carbon-based material serves as the cathode working face, reduction reaction occurs and the oxidized graphite lamella is reduced, and when it subsequently switches to the anode working face, the further oxidation allows dissociation and cutting, so that the degree of oxidation and cutting can be controlled.

In the above method, the graphene oxide includes GOQDs and/or graphene oxide microplatelets. Preferably, the GOQDs have a thickness of 1 to 10 monolayers and a particle size of 1 to 100 nm, and the graphene oxide microplatelets have a thickness of 1- to 30-monolayer and a particle size of 101 nm to 10 μm.

In the above method, preferably, the atomic ratio of carbon to oxygen and/or nitrogen in graphene oxide (i.e. GOQDs and/or graphene oxide microplatelets) is 1:1 to 25:1 (i.e. the number of carbon atoms:the number of oxygen and/or nitrogen atoms).

According to a particular embodiment of the present invention, preferably, the above method may specifically include a method for preparing graphene (oxide) quantum dots by cutting a tip face of a carbon fiber by electrochemical oxidation, comprising the steps of:

connecting a bundle-like carbon fiber (of a single filament or multiple filaments) serving as an anode and an inert electrode serving as a cathode to the positive and negative electrodes of a DC power supply, respectively;

immersing the inert electrode (fully or partially) in an electrolyte solution; wherein the working face of the carbon fiber anode consists of the aligned tip face of the bundle, and the tip face of the carbon fiber is positioned in contact and parallel with the liquid surface of the electrolyte solution before electrification;

then starting electrification, during which the working zone for the tip face of the carbon fiber is located between −5 mm below and 5 mm above the liquid surface of the electrolyte solution (preferably −3 mm to 5 mm); and intermittently or continuously controlling the tip face of the carbon fiber within the working zone, such that the microcrystalline graphite lamella on the tip face of the carbon fiber is expansion-exfoliated and cut into graphene quantum dots (i.e. graphene oxide quantum dots) by electrochemical oxidation, which are dissolved in the electrolyte solution to obtain a solution of graphene quantum dots (i.e. a solution of graphene oxide quantum dots).

In the above method for preparing graphene oxide quantum dots, preferably, the raw material carbon fiber consists of microcrystalline graphite lamellar structures, wherein the 3-dimensional size of microcrystal is from 10 to 100 nm, and the orientation of the microcrystalline graphite lamellae is not less than 60% with respect to the axial direction of the fiber; the carbon fiber is a conductive carbon-based material of various shapes obtained by high-temperature carbonization, with the diameter of a single filament in the bundle being 1 to 15 µm. The microcrystalline graphite lamellae have a small size that favors the subsequent cutting by electrochemical oxidation, allowing exfoliation thereof into 1- to 10-layer graphene (oxide) quantum dots having a particle size of 1 to 100 nm; are highly oriented, which favors the control of the size and shape of graphene oxide quantum dots during the electrochemical cutting. The carbon fibers obtained upon high-temperature carbonization is highly conductive, which favors the electron transfer required by the electrochemical oxidation and cutting process, and also favors the reduction in heat release during the preparation. The bundle-like morphology favors a more uniform distribution of electric current and the direct application of current to microcrystalline structures to complete a fast oxidation and cutting process, and the regular morphology also prevents uncontrolled breaking of fibers, which is beneficial to improvement in the effective yield of the products.

In an embodiment of the above preparation of graphene oxide quantum dots, a bundle-like carbon fiber serving as an anode and an inert electrode serving as a cathode are connected to the positive and negative electrodes of a DC power supply, respectively, wherein the inert electrode is fully immersed in an electrolyte solution of an electrolytic cell; the working face of the carbon fiber anode consists of the aligned tip face of the bundle, and the tip face of the carbon fiber is positioned in contact and parallel with the liquid surface of the electrolyte solution before electrification (the error of the tip face entering the solution is acceptable within a range not beyond 3 mm relative to the liquid surface); after electrification, under the mechanical action of the surface tension and the bubbles generated on the surface of electrodes, liquid climbing occurs and allows the tip face of the carbon fiber to also work above the liquid surface of the electrolyte solution before electrification, and the working zone for the tip face of the carbon fiber during electrification is between −5 mm below and 5 mm above the liquid surface of the electrolyte solution (preferably −3 mm to 5 mm); and the tip face of the carbon fiber is intermittently or continuously controlled within the working zone due to liquid surface movement upon electrification, such that the microcrystalline graphite lamella on the tip face of the carbon fiber is expansion-exfoliated and cut into 1- to 10-layer thick graphene oxide quantum dots having a particle size of 1 to 100 nm by electrochemical oxidation, which are dissolved in the electrolyte solution. The graphene oxide quantum dots may be further separated from the solution to obtain a colloidal or solid form of graphene oxide quantum dots.

In the above method for preparing graphene oxide quantum dots, preferably, the carbon fiber includes one of, or a combination of more of, polyacrylonitrile-based carbon fibers, pitch-based carbon fibers, rayon-based carbon fibers, and graphite fibers.

In the above method for preparing graphene oxide quantum dots, preferably, the cutting by electrochemical oxidation is implemented with the following controlled electrochemical parameters: the working voltage of the DC power supply is not higher than 80 V, and the working current density with respect to the tip face of the carbon fiber is 1 to 30 A/cm$^2$. As long as the requirement of the working current density is satisfied, the DC power supply may be controlled in a constant-voltage mode or a constant-current mode. The DC working voltage is set to meet the requirement of outputting sufficient working current. A lower working current density on the tip surface of the carbon fiber lowers the cutting performance by the oxidation, resulting in low efficiency and affecting the product quality. A higher working current density improves the cutting performance by the oxidation, but may cause ablation to the carbon fiber, serious temperature rising in the solution, and even large-scale degradation, resulting in decreased yield, increased energy consumption, and affected product quality.

In the above method for preparing graphene oxide quantum dots, preferably, the yield of the 1- to 10-layer thick graphene (oxide) quantum dots having a particle size of 1 to 100 nm is not less than 90% (here, the yield refers to the ratio of the mass of the portion of the 3-dimensional carbon-based material as a reactant that can be effectively converted into the target product-graphene oxide to the initial mass of the 3-dimensional carbon-based material).

In the above method for preparing graphene oxide quantum dots, preferably, the prepared graphene (oxide) quantum dots have a carbon/oxygen atomic ratio of 2:1 to 20:1.

In the above method for preparing graphene oxide quantum dots, preferably, when a polyacrylonitrile-based carbon fiber is used as the raw material, the prepared graphene (oxide) quantum dots are doped with nitrogen, and have a nitrogen atom content (the content of the number of atoms) of 1% to 6%.

In the above method for preparing graphene oxide and the specific preferred method for preparing graphene oxide quantum dots, preferably, the electrolyte solution is a solution having an ion-conducting ability and having conductivity not less than 10 mS/cm. If the conductivity of the solution is too low, the electrochemical processing efficiency will be lowered, the temperature of the solution will rise too fast, the energy consumption will increase, and the product quality will decrease.

In the above method for preparing graphene oxide and the specific preferred method for preparing graphene oxide quantum dots, the inert material is a conductive material resistant to the corrosion by the electrolyte solution, and preferably includes one of, or a combination of more of stainless steel, titanium, platinum, nickel-based alloy, copper, lead, graphite, and titanium oxides.

According to a specific embodiment of the present invention, preferably, the above method for preparing graphene oxide and the specific preferred method for preparing graphene oxide quantum dots further comprise the step of: separating the graphene oxide-containing electrolyte solution and/or the graphene (oxide) quantum dot solution by a physical and/or chemical method to remove the electrolyte(s) and impurities therefrom, so as to obtain a solution containing graphene oxide in water or an organic solvent or graphene oxide in a colloidal or solid form, and/or a solution containing graphene (oxide) quantum dots in water or an organic solvent or graphene (oxide) quantum dots in a colloidal or solid form, wherein the organic solvent includes one of, or a combination of more of ethylene glycol, diethylene glycol, ethylene diamine, N-2-methylpyrrolidone, N,N-dimethylformamide and dimethyl sulfoxide. More preferably, the physical and/or chemical method includes one of, or a combination of more of filtration, vacuum drying, freeze drying, centrifuging, dialysis, distillation, extraction, and chemical precipitation.

More particularly, the above method for preparing graphene oxide may further comprise the step of: separating the graphene oxide-containing electrolyte solution by a physical and/or chemical method to remove the electrolyte(s) and impurities therefrom, so as to obtain a solution containing graphene oxide in water or an organic solvent or a solid-phase graphene oxide, wherein the organic solvent includes one of, or a combination of more of ethylene glycol, diethylene glycol, ethylene diamine, N-2-methylpyrrolidone, N,N-dimethylformamide and dimethyl sulfoxide. More preferably, the physical and/or chemical method includes one of, or a combination of more of filtration, centrifuging, dialysis, distillation, extraction, and chemical precipitation. The above preferred method for preparing graphene oxide quantum dots may further comprise the step of: separating the graphene (oxide) quantum dots in the graphene (oxide) quantum dot solution from the liquid, so as to obtain graphene (oxide) quantum dots in a colloidal or solid form. More preferably, the method for separating the graphene (oxide) quantum dots in the graphene (oxide) quantum dot solution from the liquid includes one of, or a combination of more of centrifuging, vacuum drying, and freeze drying.

According to a specific embodiment of the present invention, preferably, the above method for preparing graphene oxide and the specific preferred method for preparing graphene oxide quantum dots further comprise the step of: subjecting the graphene oxide-containing electrolyte solution and/or the graphene (oxide) quantum dot solution to vacuum filtration and/or dialysis treatment to further narrow down the particle-size distribution of the product.

According to a specific embodiment of the present invention, preferably, the above method further comprises the step of: subjecting the graphene oxide (in a solution, or in a colloidal or solid form) and/or the graphene (oxide) quantum dots (in a solution, or in a colloidal or solid form) to one or more treatments of liquid-phase chemical reduction, electrochemical reduction, thermal reduction, UV-radiation-induced reduction, microwave reduction, active-metal reduction, and gas-phase reduction, to further increase the carbon/oxygen atomic ratio. In this case reduced GQDs and/or graphene microplatelets are obtained.

The method for preparing graphene oxide provided according to the present invention is different from traditional electrochemical preparation methods in that, it can focus the electric current on a very small area, in which not only a uniform distribution of current density is achieved to avoid the problems of debris and variation in product morphology and size caused by uneven distribution of current density over various sites (the end face, side face, or parts in the solution or at the liquid surface) of the working electrodes in traditional electrochemical preparation methods, but also very high energy density is obtained. As compared to traditional electrochemical preparation methods, the method according to the present invention has a higher exfoliating and cutting ability by oxidation expansion, and can realize the rapid and high-yield preparation of graphene oxide having fewer layers and controllable particle size and particle-size distribution.

Embodiments of the present invention further provide the graphene oxide prepared by the above method for preparing graphene oxide by cutting an end face of a 3-dimensional carbon-based material by electrochemical oxidation. It is to be noted that when the reduction treatment in the above method is applied to increase the carbon/oxygen atomic ratio, reduced graphene (including GQDs and/or graphene microplatelets) is obtained.

According to a specific embodiment of the present invention, preferably, the graphene oxide includes GOQDs and/or graphene oxide microplatelets, wherein the GOQDs have a thickness of 1 to 10 monolayers and a particle size of 1 to 100 nm, and the graphene oxide microplatelets have a thickness of 1 to 30 monolayers and a particle size of 101 nm to 10 μm. It is to be noted that even after the reduction treatment in the above method is applied to increase the carbon/oxygen atomic ratio, the size of the reduced GQDs and/or graphene microplatelets obtained is still within the above ranges.

According to a specific embodiment of the present invention, preferably, the atomic ratio of carbon to oxygen and/or nitrogen in the graphene oxide (i.e. GOQDs and/or graphene oxide microplatelets) is 1:1 to 25:1 (i.e. the number of carbon atoms:the number of oxygen and/or nitrogen atoms). It is to be noted that even after the reduction treatment in the above method is applied to increase the carbon/oxygen atomic ratio, the atomic ratio of carbon to oxygen and/or nitrogen in the reduced GQDs and/or graphene microplatelets obtained is still within the above ranges.

Embodiments of the present invention further provide the GQDs (including GOQDs) prepared by the above preferred method for preparing GOQDs, which have a thickness of 1 to 10 layers and a particle size of 1 to 100 nm.

According to a specific embodiment of the present invention, preferably, the atomic ratio of carbon to oxygen in the GQDs (including GOQDs) is 2:1 to 20:1.

According to a specific embodiment of the present invention, preferably, the GQDs (including GOQDs) are doped with nitrogen, and have a nitrogen atom content of 1% to 6%.

It is to be noted that the term "graphene (oxide) quantum dots" as used herein refers to "graphene oxide quantum dots".

In summary, as compared to chemical oxidation methods and traditional electrochemical preparation methods, the method for preparing graphene oxide according to the present invention has a higher exfoliating and cutting ability by oxidation expansion, and have numerous advantages in that the product has a small particle size, fewer layers, and controllable particle-size distribution and oxidation degree, the raw materials are abundantly available and cheap, the production facilities and preparation process are simple and the method can be applied in large-scale industrial production with low energy consumption, high productivity, high yield, and no contamination.

REFERENCE NUMBERS OF MAIN COMPONENTS

Figure 1:
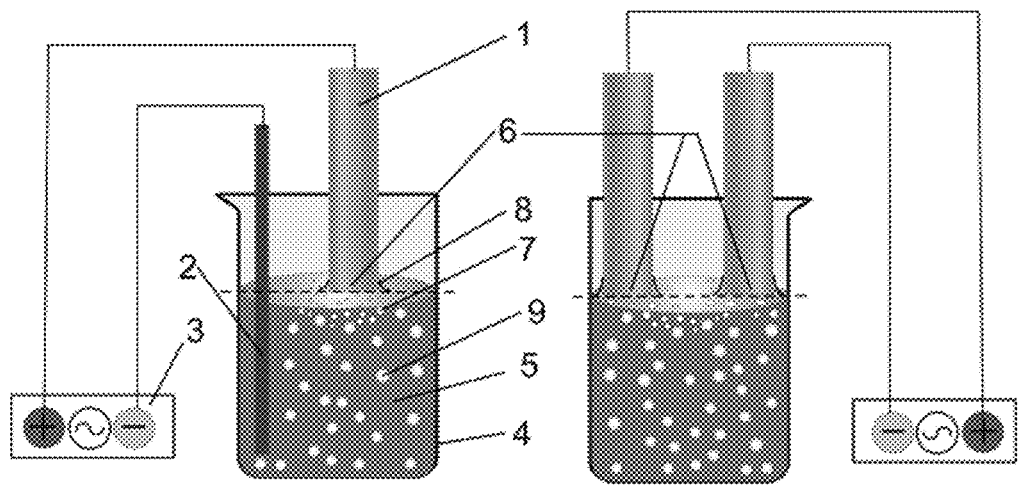
FIG. 1 is a schematic representation of the principle of the method for preparing graphene oxide by cutting an end face of a 3-dimensional carbon-based material by electrochemical oxidation provided according to the present invention.

Anode 1, Cathode 2, DC power supply 3, Electrolytic cell 4, Electrolyte solution 5, End face 6, Bubble 7, Climbed liquid surface 8, Graphene oxide 9, Tip face 10, Graphene quantum dots 11.

EMBODIMENTS OF INVENTION

In order to provide a better understanding of the technical features, objectives and beneficial effects of the present invention, the technical solutions of the present invention will be described hereinafter in detail, but are not to be construed as limiting the practical scope of the present invention.

Figure 2:
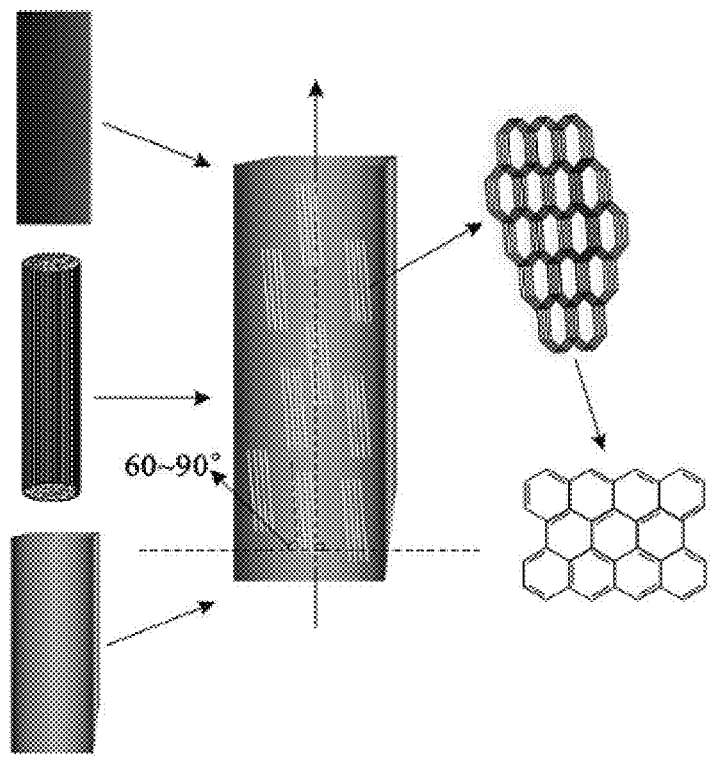
FIG. 2 is a schematic representation showing the structural relationship between the macroscopic end face and the microscopic graphite lamella of a 3-dimensional carbon-based material used according to the present invention.

FIG. 1 shows the principle of the method for preparing graphene oxide by cutting an end face of a 3-dimensional carbon-based material by electrochemical oxidation provided according to the present invention. Preferably, a piece of a 3-dimensional carbon-based material may serve as the anode 1, another piece of a 3-dimensional carbon-based material or inert material may serve as the cathode 2, and they are connected respectively to the positive and negative electrodes of a DC power supply 3, wherein the other piece of a 3-dimensional carbon-based material or inert material is fully or partially (for example, half) immersed in an electrolyte solution 5 in an electrolytic cell 4; the working face of the piece of the 3-dimensional carbon-based material serving as the anode is a macroscopic end face 6 composed of the microscopic parallel graphite lamellar structures, and is positioned in contact and parallel with the liquid surface of an electrolyte solution before electrification; after electrification, under the mechanical action of the surface tension and the bubbles 7 generated at the anode, climbed liquid surface 8 occurs and allows the end face 6 of the 3-dimensional carbon-based material to also work above the liquid surface of the electrolyte solution; the working zone for the end face 6 of the 3-dimensional carbon-based material during electrification is between −5 mm below and 5 mm above the liquid surface of the electrolyte solution; the end face 6 of the 3-dimensional carbon-based material is intermittently or continuously controlled within the above working zone due to liquid surface movement upon electrification, such that the microscopic graphite lamella on the end face 6 of the piece of 3-dimensional carbon-based material is expansion-exfoliated and cut into graphene oxide 9 by electrochemical oxidation, which is dispersed in the electrolyte solution, so as to obtain a graphene oxide-containing electrolyte solution; furthermore, the electrolyte(s) and impurities therein are removed by a physical and/or chemical method, so as to obtain a solution containing graphene oxide in water or an organic solvent or graphene oxide in a colloidal or solid form. The end face 6 serving as the working face and positioned in contact and parallel with the liquid surface of the electrolyte solution is a macroscopic surface at an angle of 60° to 90° with respect to one of the two-dimensional orientations of the microscopic graphite lamella of the 3-dimensional carbon-based material, and the relationship therebetween is schematically shown in FIG. 2. In addition, an end face of one piece of a 3-dimensional carbon-based material and an end face of the other piece of a 3-dimensional carbon-based material may both serve as working faces and be positioned in contact and parallel with the liquid surface of the electrolyte solution, before electrification and reaction. Furthermore, the two pieces as electrodes may exchange their polarity with each other before electrification and reaction, such that one end face of one piece of a 3-dimensional carbon-based material, or two end faces of both pieces of 3-dimensional carbon-based materials, may alternately work as the anode and cathode working faces.

Figure 3:
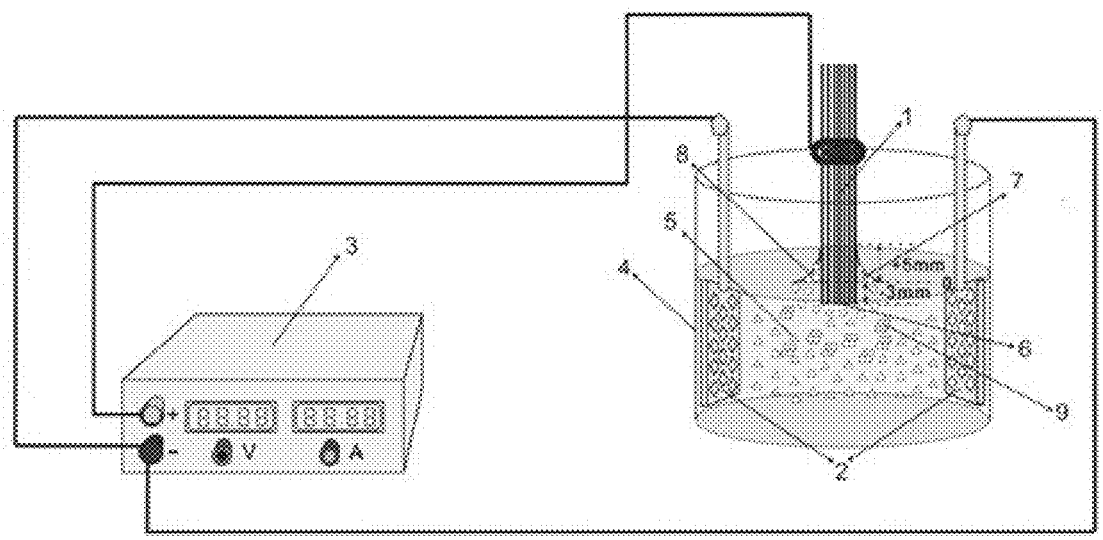
FIG. 3 is a schematic representation of the principle of the method for preparing graphene quantum dots by cutting a tip face of a carbon fiber by electrochemical oxidation provided according to a specific embodiment of the present invention.
Figure 4:
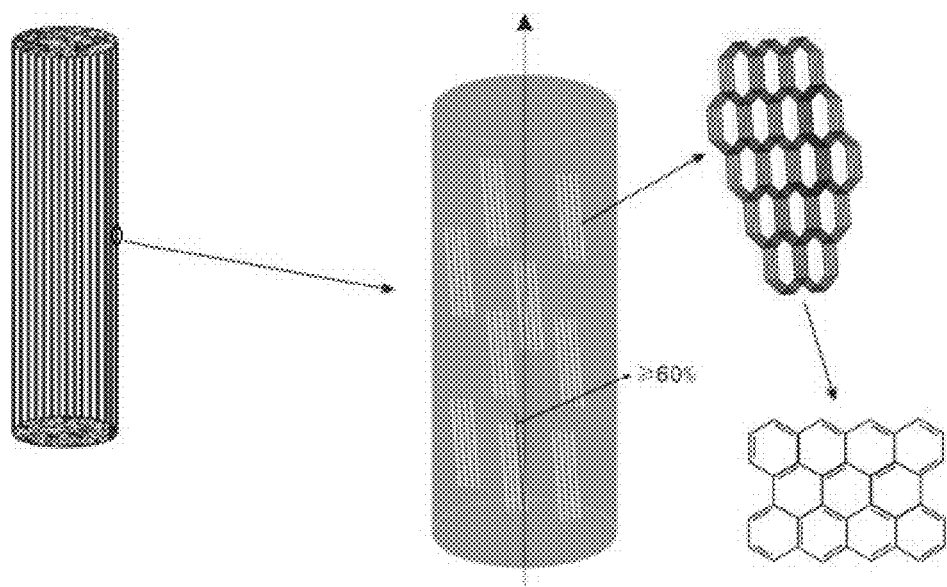
FIG. 4 a schematic representation showing a bundle of carbon fiber used according to a specific embodiment of the present invention and the microcrystal structure of a single filament in the fiber.

In a specific embodiment of the present invention, graphene (oxide) quantum dots may be prepared by cutting a tip face of a carbon fiber by electrochemical oxidation, and the principle of this method is schematically shown in FIG. 3. A bundle of carbon fiber serving as the anode 1 and an inert electrode serving as the cathode 2 are connected to the positive and negative electrodes of a DC power supply, respectively, wherein the inert electrode is fully immersed in an electrolyte solution 5 of an electrolytic cell 4; the working face of the carbon fiber anode consists of the aligned tip face 10 of the bundle, and the tip face 10 of the carbon fiber is positioned in contact and parallel with the liquid surface of the electrolyte solution before electrification; after electrification, under the mechanical action of the surface tension and the bubbles 7 generated at the anode, climbed liquid surface 8 occurs and allows the tip face 10 of the carbon fiber to also work above the liquid surface of the electrolyte solution, and the working zone for the tip face 10 of the carbon fiber during electrification is between −5 mm below and 5 mm above the liquid surface of the electrolyte solution (preferably −3 mm to 5 mm); and the tip face 10 of the carbon fiber is intermittently or continuously controlled within the working zone due to liquid surface movement upon electrification, such that the microcrystalline graphite lamella on the tip face 10 of the carbon fiber is expansion-exfoliated and cut into 1- to 10-layer thick graphene (oxide) quantum dots 11 having a particle size of 1 to 100 nm by electrochemical oxidation, which are dissolved in the electrolyte solution to obtain a graphene (oxide) quantum dot solution. The bundle of carbon fiber and the microcrystal structure on a single filament in the fiber are shown in FIG. 4. The raw material carbon fiber consists of microcrystalline graphite lamellar structures, wherein the 3-dimensional size of microcrystal is from 10 to 100 nm, and the microcrystalline graphite lamellae are oriented at an angle of not less than 60° with respect to the axial direction of the fiber; the carbon fiber is a conductive carbon-based material of various shapes obtained by high-temperature carbonization, preferably in a bundle-like form, with the diameter of a single filament being 1 to 15 μm.

Hereinafter the technical solutions of the present invention are further illustrated by way of examples.

Example 1

T300 12K (12,000 single filaments) polyacrylonitrile-based carbon fiber bundles were used as the raw material. The single filament of the carbon fiber had a diameter of 7 μm, and was composed of microcrystalline graphite lamellar structures, wherein the 3-dimensional size of the microcrystal was from 10 to 40 nm, and the orientation of the microcrystalline graphite lamellae along the fiber axial direction was at an angle of about 80° with respect to the tip face of the fiber. The tip faces of 78 carbon fiber bundles were cut together such that they were aligned, and these cut bundles were vertically placed above an electrolytic cell containing an aqueous solution of 0.5 M ammonium carbonate and were connected as the anode to the positive electrode of a DC power supply; a SS304 stainless-steel screen having an area of 100 $cm^2$ was fully immersed in the solution and connected as the cathode to the negative electrode of the DC power supply; before electrification, the aligned tip faces of the carbon fiber bundles were carefully adjusted to be in parallel with and just in contact with the liquid surface of the solution, wherein the error of the tip faces entering the solution was acceptable within a range not beyond 5 mm from the liquid surface; then the DC power supply was switched on and started to work at a constant voltage controlled at 32 V, a large amount of bubbles were generated at the anode, and liquid climbing was observed under the action of surface tension and the bubbles generated by anode oxidation, where the tip face of the carbon fiber may be adjusted to work within a range not beyond 5 mm above the liquid surface, in which case the working current density with respect to the area of the tip face may vary between +1 to 20 $A/cm^2$; with the electrolysis proceeding, when the current density was below 1 $A/cm^2$ (accompanied by the phenomenon that the distance between the tip face and the liquid surface of the electrolyte solution increased), the distance between the tip face and the liquid surface was either shortened by adjustment such that the electrolysis can continuously proceed, or adjusted to increase to interrupt the reaction and then shortened to allow working within the range of −5 mm to 5 mm such that the electrolysis can intermittently proceed; with the electrolysis proceeding, the microcrystalline graphite lamellae on the tip face of the carbon fiber bundle was expansion-exfoliated and cut by the electrochemical oxidation, and continually dissolved in the solution, resulting in the color of the solution gradually changing from light yellow to bright yellow, dark yellow, brown yellow, and dark brown over time, corresponding to a gradual increase in the concentration of GOQDs produced, so that an electrolyte solution containing GOQDs not more than 10 mg/mL was obtained; finally, large granules of carbon fiber debris were removed from the solution by vacuum filtration, and the filtrate was heated to thermally decompose ammonium carbonate, to obtain an aqueous solution containing GOQDs only.

Figure 5A:
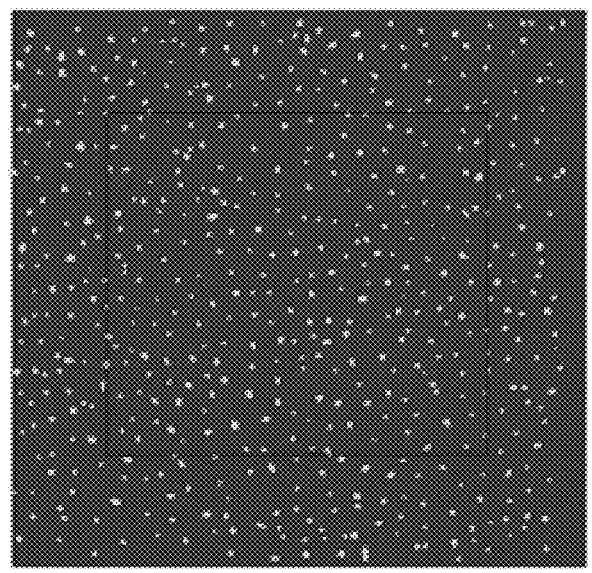
FIGS. 5a and 5b are respectively the atomic force microscope image and the height analysis curve of the graphene oxide quantum dots provided according to Example 1.
Figure 5B:
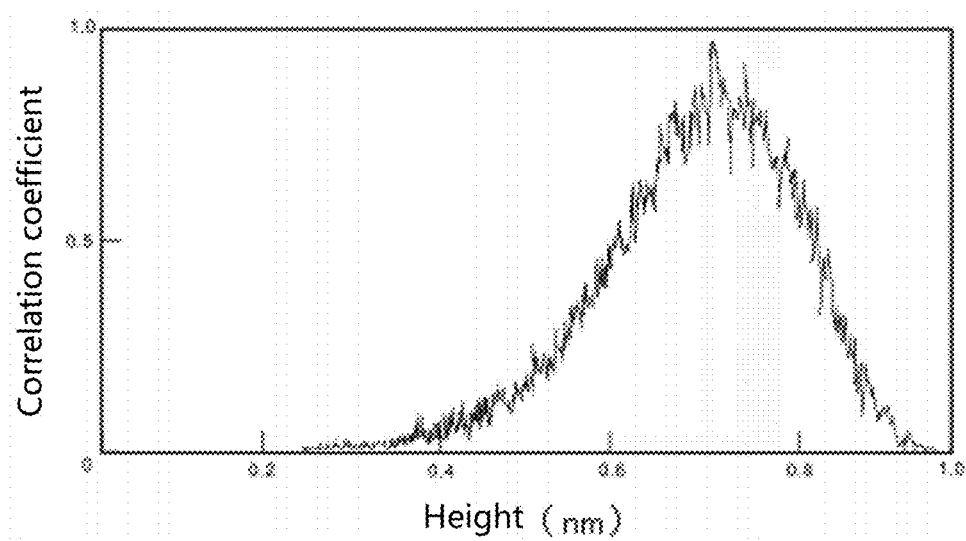
Figure 6:
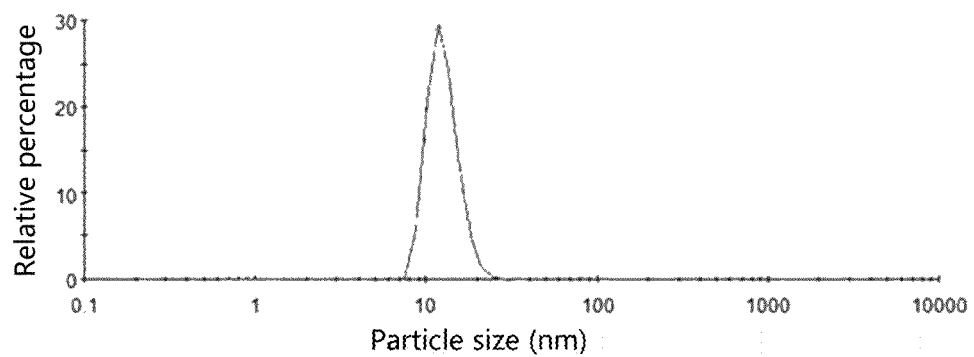
FIG. 6 is the particle-size distribution curve of the graphene oxide quantum dots provided according to Example 1.
Figure 7:
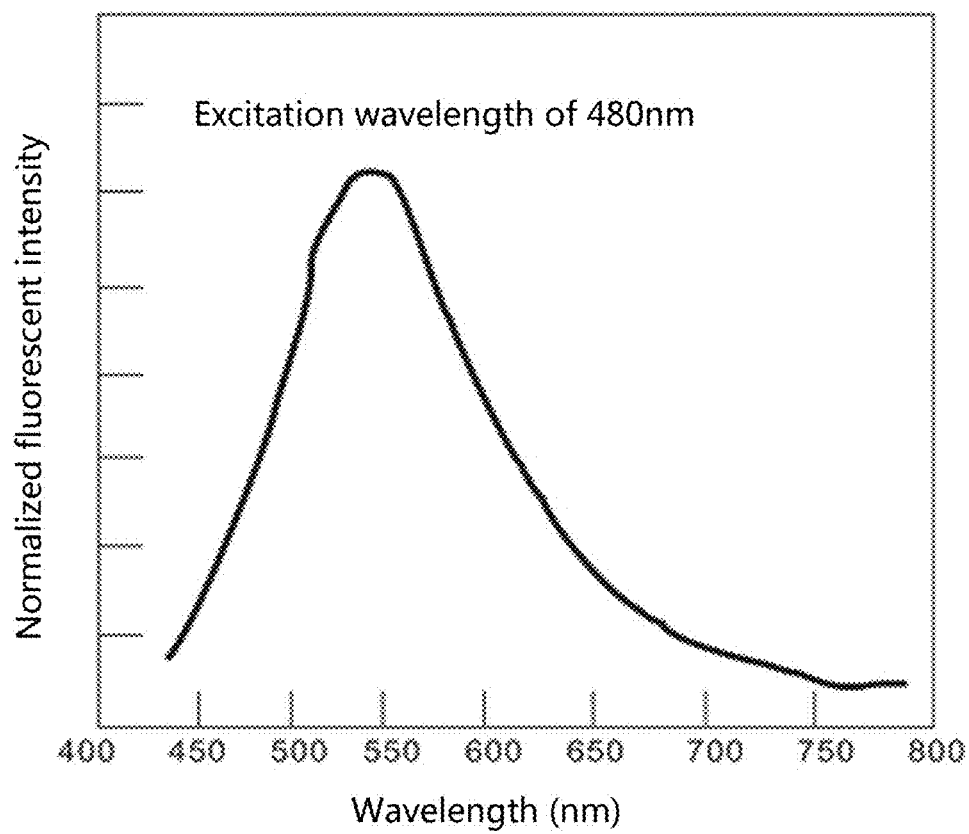
FIG. 7 is the fluorescent spectrum of the graphene oxide quantum dots provided according to Example 1.
Figure 8:
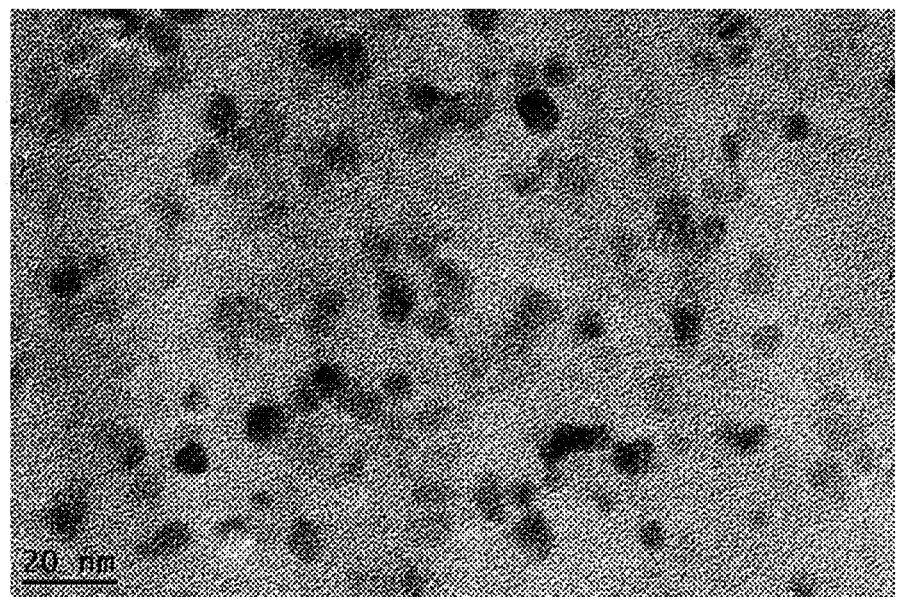
FIG. 8 is the transmission electron microscope (TEM) image of the graphene oxide quantum dots provided according to Example 1.
Figure 9:
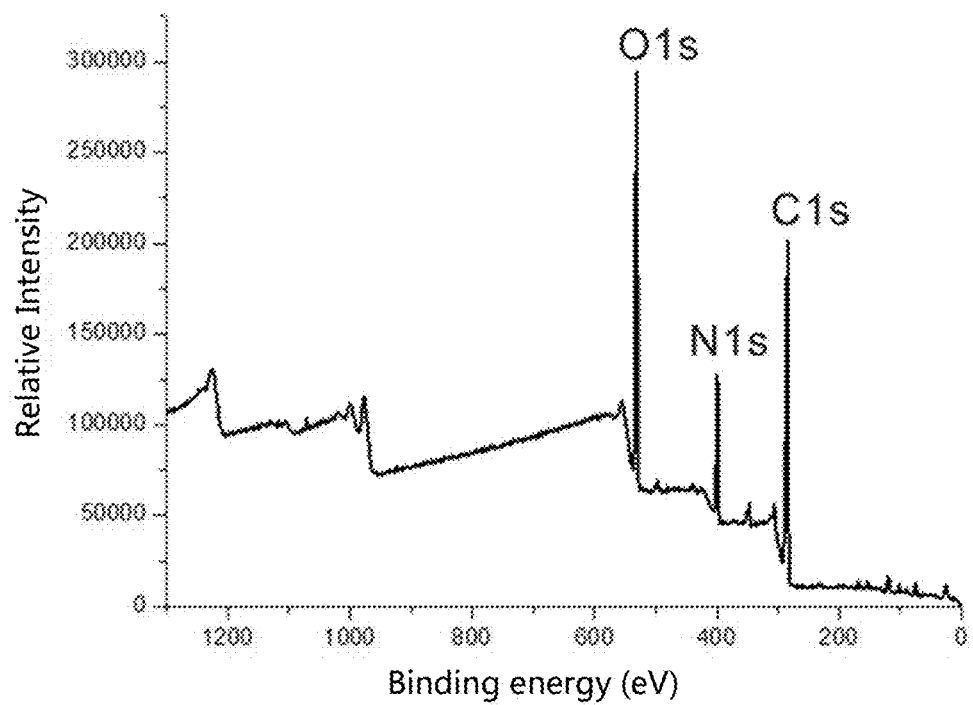
FIG. 9 is the photoelectron spectroscope image of the graphene oxide quantum dots provided according to Example 1.

The aqueous solution containing GOQDs obtained above was transferred to a neat silicon slice, air-dried, and observed with an atomic force microscope. As shown in FIGS. 5a and 5b, the peak height of the quantum dots is 0.706 nm, equivalent to the thickness of two-layer graphene; the average height thereof over the particle-size distribution is 0.339 nm, equivalent to the thickness of monolayer graphene, and showing a relatively uniform distribution. The aqueous solution containing GOQDs obtained above was directly analyzed in a dynamic light scattering (DLS) for particle-size distribution analysis. As shown in FIG. 6, the range of the particle-size distribution obtained from the analysis is 3 to 25 nm, indicating a relatively narrow distribution. In a fluorescent spectrum analysis, as shown in FIG. 7, with an excitation wavelength of 480 nm, the emission wavelength is 540 nm. The aqueous solution containing GOQDs obtained above was dialyzed through a 2000 D membrane, to obtain GOQDs (in a solution) having a particle-size distribution of 3 to 10 nm, as shown in FIG. 8. The aqueous solution containing GOQDs obtained above was vacuum dried or freeze dried to obtain solid-phase GOQDs, which were analyzed by photoelectron spectroscopy (XPS). As shown in FIG. 9, the atomic ratio of carbon to (oxygen+nitrogen) is 1:1. The GOQDs obtained herein are doped with nitrogen, because the raw material polyacrylonitrile-based carbon fiber per se contains nitrogen. By comparison between the mass of the GOQDs produced and the mass loss of the carbon fiber bundles, the preparation yield of GOQDs was 93%.

Example 2

Figure 10A:
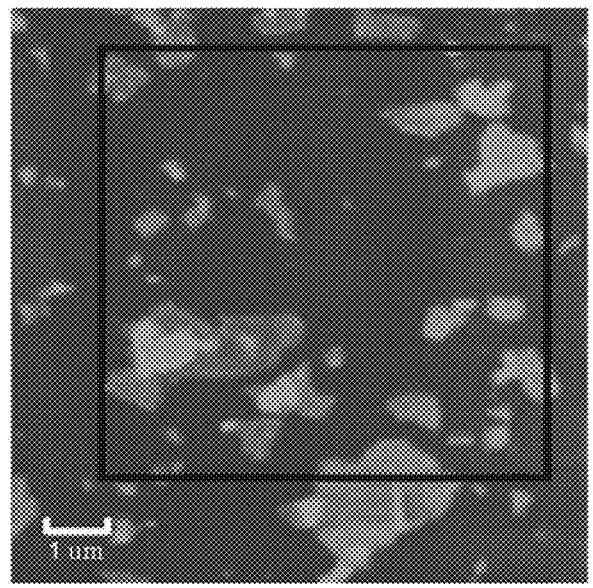
FIGS. 10a and 10b are respectively the atomic force microscope image and the height analysis curve of the graphene oxide microplatelets provided according to Example 2.
Figure 10B:
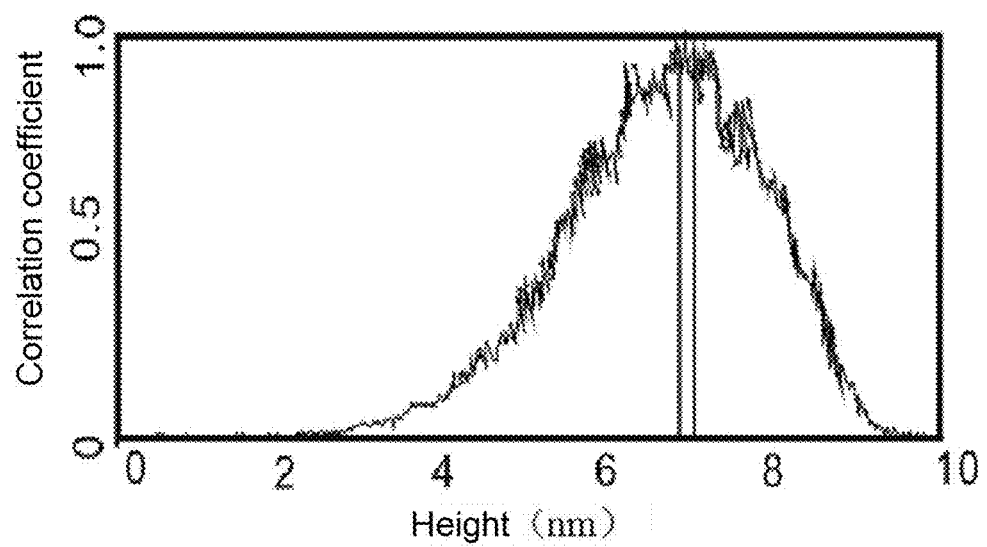
Figure 11:
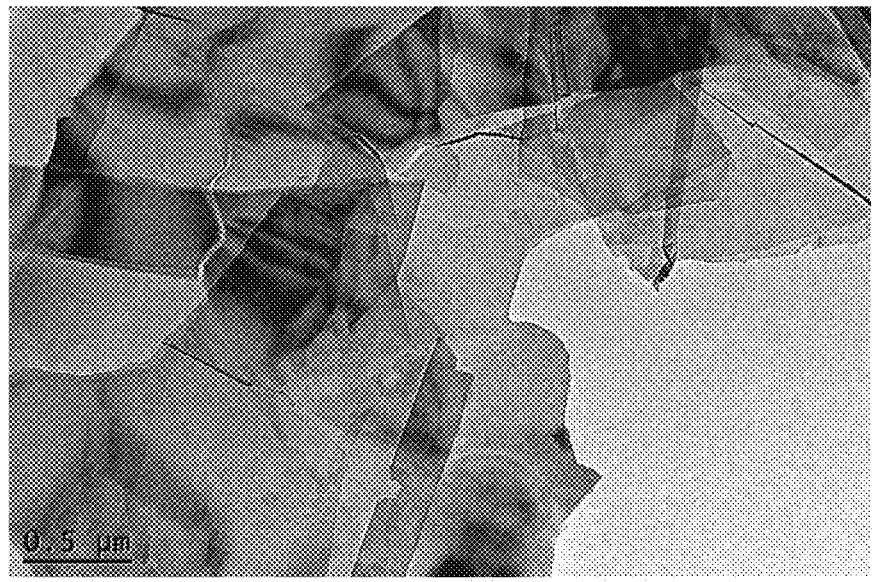
FIG. 11 is the transmission electron microscope (TEM) image of the graphene oxide microplatelets provided according to Example 2.
Figure 12:
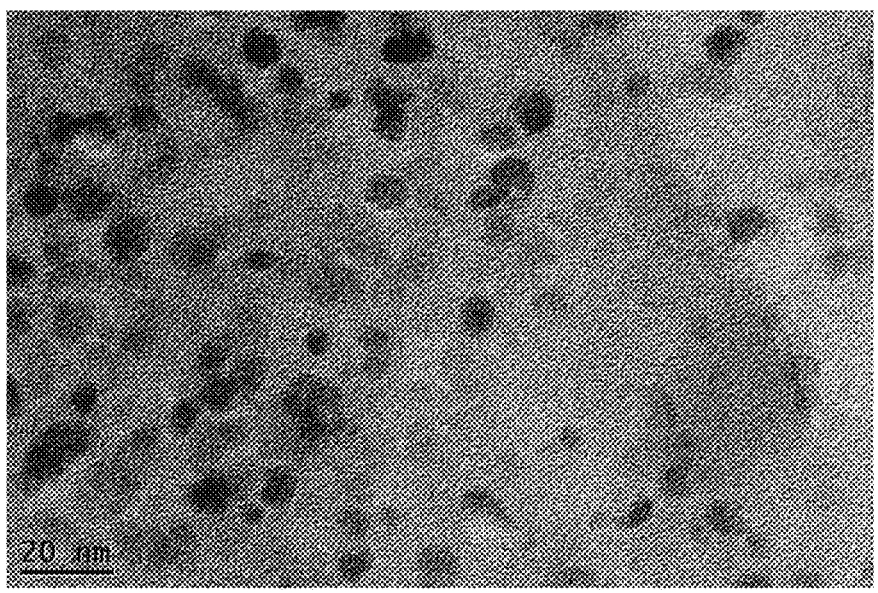
FIG. 12 is the transmission electron microscope (TEM) image of the graphene oxide quantum dots provided according to Example 2.

Example 2 differs from Example 1 mainly in that: a piece of 0.1 mm thick graphite paper was used as the raw material, a face on the end along the longitudinal direction of the graphite paper was used as the working face, the electrolyte solution was a 0.1 M sodium sulfate solution, and the cathode was a 100 $cm^2$ nickel chip; a constant voltage was controlled at 40 V, and the working current density varied in a range of +1 to 300 $A/cm^2$; an electrolyte solution containing GOQDs and graphene oxide microplatelets at a concentration not higher than 100 mg/mL was obtained, and subjected to multiple separations by centrifuging and washings with water, to separately obtain a slurry of graphene oxide microplatelets and a mixed solution of GOQDs and sodium sulfate; the slurry of graphene oxide microplatelets was dried and dispersed by ultrasonication to obtain a dispersion of graphene oxide microplatelets in ethylene glycol; the mixed solution of GOQDs and sodium sulfate was treated at a low temperature to precipitate most of the sodium sulfate as crystal, and then the supernatant was dialyzed to obtain an aqueous solution containing GOQDs only. FIGS. 10*a* and 10*b* are respectively the atomic force microscope image and the height analysis curve of the graphene oxide microplatelets produced, wherein the height of the microplatelets is distributed in a range of 0.7 to 10 nm, equivalent to the thickness of 2 to 30 monolayers. As shown in FIG. 11, the platelet diameter of the microplatelets is 1 to 10 μm. As shown in FIG. 12, the GOQDs obtained are 1- to 2-layer thick, and have a particle-size distribution of 7 to 15 nm.

Example 3

Example 3 differs from Example 1 mainly in that: the tip face of T700 12K (12,000 single filaments) polyacrylonitrile-based carbon fiber bundles was used alternately as the anode working face (in this case a 100-cm$^2$ titanium-based IrO$_2$ electrode served as the cathode) and the cathode working face (in this case a 100-cm$^2$ titanium-based IrO$_2$ electrode served as the anode); specifically, the tip face served as the anode was first oxidized for 1 min, and then as the anode was reduced for 30 s, wherein with respect to the tip face the anode working current density was +1 to 50 A/cm$^2$, and the cathode working current density was −1 to −10 A/cm$^2$; the working voltage of the DC power supply during the alternate electrolysis cycle did not exceed 80 V; the GOQDs finally obtained were a monolayer, and had a particle-size distribution of 1 to 5 nm, a carbon/(oxygen+nitrogen) atomic ratio of 9:1, and a preparation yield of 98%.

Example 4

Example 4 differs from Example 2 mainly in that: two 1-mm thick flexible graphite sheets were used as the raw material, the electrolyte solution used was 1 M sulfuric acid, a face on the end along the longitudinal direction of each of the graphite sheets was used as the working face, and both working faces were positioned in contact and parallel with the liquid surface of the electrolyte solution and alternately served as the anode working face and the cathode working face; specifically, one working face served as the anode and the other as the cathode to carry out 3-min electrolysis, and then the polarities of two working faces were exchanged to carry out 3-min electrolysis, wherein with respect to the tip face the anode and cathode working current densities were ±(1 to 300) A/cm$^2$, and the working voltage of the DC power supply during the alternate electrolysis cycle did not exceed 100 V; the graphene oxide microplatelets obtained were 1- to 10-layer thick, had a platelet diameter of 0.2 to 1 μm, and had a carbon/oxygen atomic ratio of 22:1; the GOQDs obtained were 1- to 3-layer thick, had a pre-dialysis particle-size distribution of 2 to 100 nm and a post-dialysis particle-size distribution of 2 to 7 nm, and had a carbon/oxygen atomic ratio of 10:1.

Example 5

Example 5 differs from Example 4 mainly in that: both 220 HM110 4K pitch-based carbon fiber bundles and a 0.05-mm thick flexible graphite sheet were used as the raw material, and the electrolyte solution used was a 2 M ammonium sulfate solution; the graphene oxide microplatelets obtained were 1- to 5-layer thick, and had a platelet diameter of 0.11 to 0.45 μm; the GOQDs obtained were 1- to 5-layer thick, and had a particle-size distribution of 1 to 100 nm.

Example 6

T300 12K (12,000 single filaments) polyacrylonitrile-based carbon fiber bundles were used as the raw material. The single filament of the carbon fiber had a diameter of 7 μm, and was composed of microcrystalline graphite lamellar structures, wherein the 3-dimensional size of the microcrystal was from 10 to 40 nm, and the orientation of the microcrystalline graphite lamellae was 80% with respect to the fiber axial direction. The tip faces of 78 carbon fiber bundles were cut together such that they were aligned, and these cut bundles were vertically placed above an electrolytic cell containing an aqueous solution of 0.5 M sodium hydroxide and were connected as the anode to the positive electrode of a DC power supply; a SS304 stainless-steel screen having an area of 100 cm$^2$ was fully immersed in the solution and connected as the cathode to the negative electrode of the DC power supply; before electrification, the aligned tip faces of the carbon fiber bundles were carefully adjusted to be in parallel with and just in contact with the liquid surface of the solution, wherein the error of the tip faces entering the solution was acceptable within a range not beyond 3 mm from the liquid surface; then the DC power supply was switched on and started to work at a constant voltage controlled at 32 V, a large amount of bubbles were generated at the anode, and liquid climbing was observed under the action of surface tension and the bubbles generated by anode oxidation, where the tip face of the carbon fiber may be adjusted to work within a range within 5 mm above the liquid surface, in which case the working current density with respect to the area of the tip face may vary between 1 to 10 A/cm$^2$; with the electrolysis proceeding, when the current density was below 1 A/cm$^2$ (accompanied by the phenomenon that the distance between the tip face and the liquid surface of the electrolyte solution increased), the distance between the tip face and the liquid surface was either shortened such that the electrolysis can continuously proceed, or adjusted to increase first to interrupt the reaction and then shortened to allow working within the range of −3 mm to 5 mm such that the electrolysis can intermittently proceed; with the electrolysis proceeding, the microcrystalline graphite lamellae on the tip face of the carbon fiber bundle was expansion-exfoliated and cut by the electrochemical oxidation, and continually dissolved in the solution, resulting in the color of the solution gradually changing from light yellow to bright yellow, dark yellow, brown yellow, and dark brown over time, corresponding to a gradual increase in the concentration of graphene (oxide) quantum dots produced, so that an electrolyte solution containing graphene (oxide) quantum dots not more than 10 mg/mL was finally obtained.

Figure 13A:
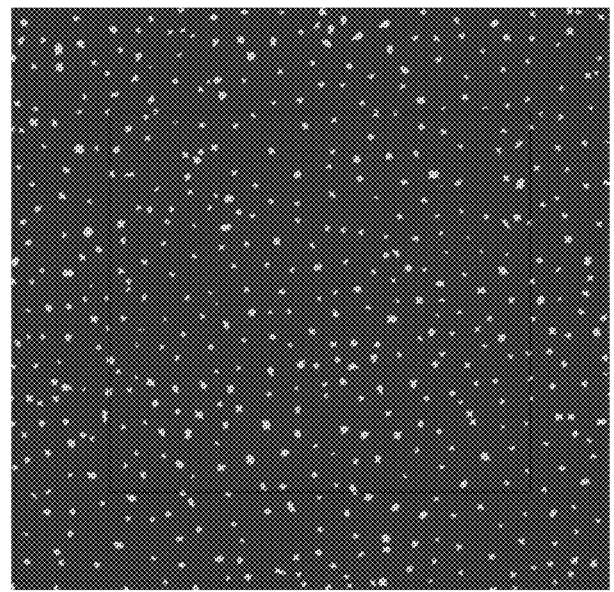
FIGS. 13a and 13b are respectively the atomic force microscope image and the height analysis curve of the graphene (oxide) quantum dots provided according to Example 6.
Figure 13B:
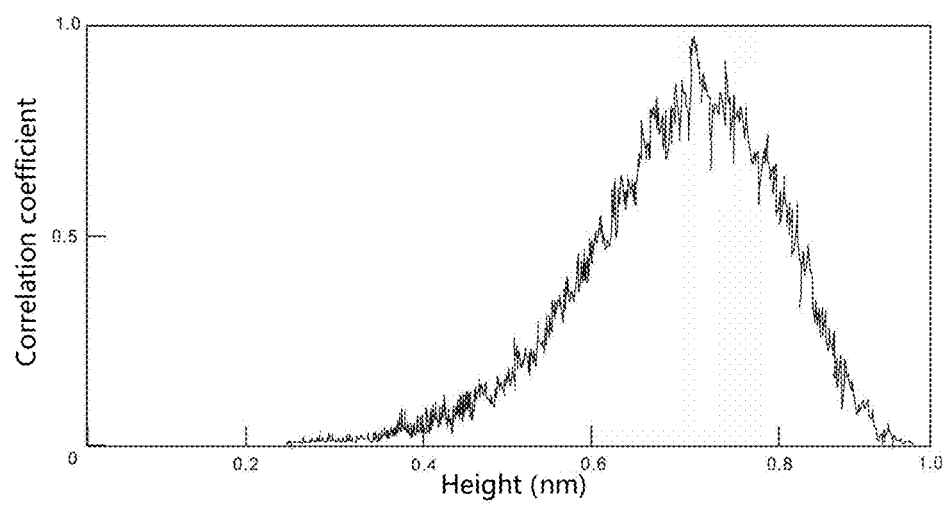
Figure 14:
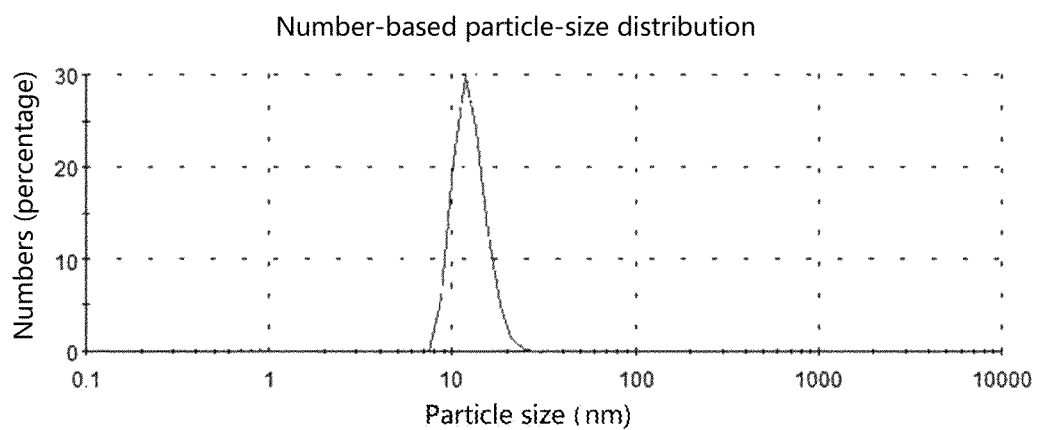
FIG. 14 is the particle-size distribution curve of the graphene (oxide) quantum dots provided according to Example 6.
Figure 15:
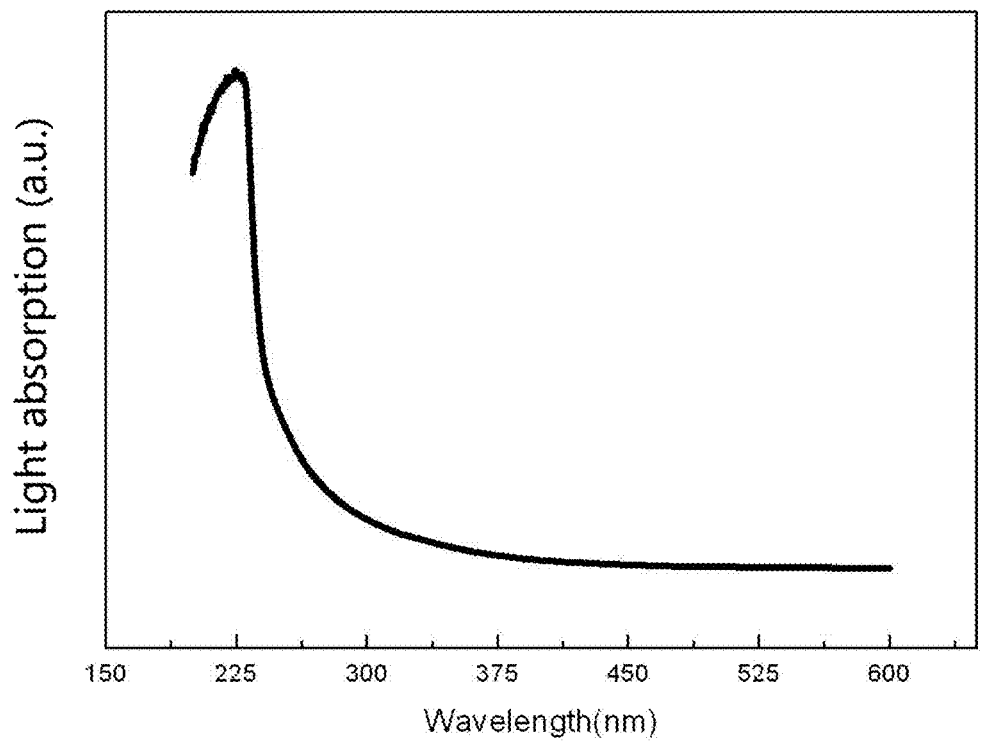
FIG. 15 is the UV-absorption spectrum of the graphene (oxide) quantum dots provided according to Example 6.
Figure 16:
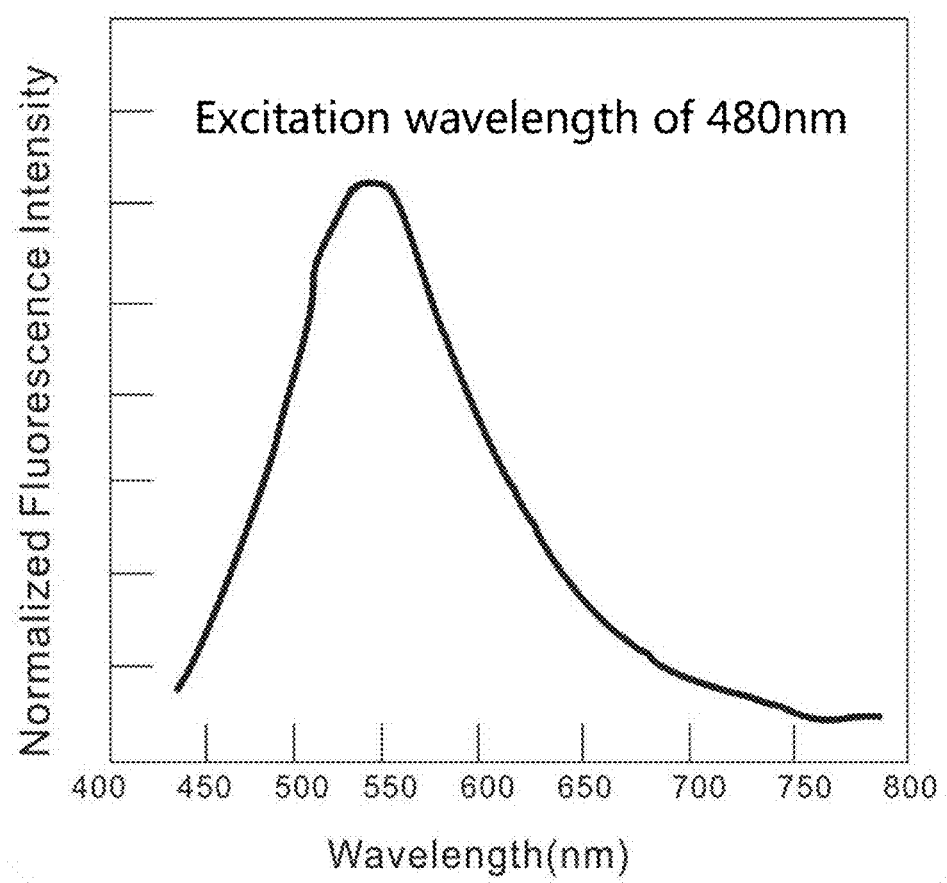
FIG. 16 is the fluorescent spectrum of the graphene (oxide) quantum dots provided according to Example 6.

The solution containing graphene (oxide) quantum dots as obtained above was transferred to a neat silicon slice, air-dried, and observed with an atomic force microscope. As shown in FIGS. 13*a* and 13*b*, the peak height of the quantum dots is 0.706 nm, equivalent to the thickness of two-layer graphene; the average height thereof over the particle-size distribution is 0.339 nm, equivalent to the thickness of monolayer graphene, and showing a relatively uniform distribution. The solution containing graphene (oxide) quantum dots as obtained above was directly analyzed in a dynamic light scattering (DLS) particle-size distribution analysis. As shown in FIG. 14, the range of the particle-size distribution obtained from the analysis is 10 to 20 nm, indicating a relatively narrow distribution. In a UV-absorption spectrum analysis further conducted, as shown in FIG. 15, a significant light-absorbing characteristic can be observed. In a fluorescent spectrum analysis, as shown in FIG. 16, with an excitation wavelength of 480 nm, the emission wavelength is 540 nm. The solution containing graphene (oxide) quantum dots as obtained above was dialyzed through a 2000 D membrane, to obtain graphene (oxide) quantum dots in a solution having a particle-size distribution of 5 to 10 nm. The obtained solution of graphene (oxide) quantum dots having a particle-size distribution of 5 to 10 nm was vacuum dried to obtain colloidal graphene (oxide) quantum dots, which were thermally reduced at 500° C. under $N_2$ protection to obtain solid-state reduced GQD powder, which was analyzed by photoelectron spectroscopy (XPS) and shown to have a carbon/oxygen atomic ratio of 11:1. The XPS reveals that the GQDs are doped with nitrogen at an atomic content of 2.6%, because the raw material polyacrylonitrile-based carbon fiber per se contains nitrogen which was doped into the GQDs obtained here. By comparison between the mass of the GQDs produced and the mass loss of the carbon fiber bundles, the preparation yield of graphene (oxide) quantum dots was 93%.

Example 7

Example 7 differs from Example 6 mainly in that: T700 12K polyacrylonitrile-based carbon fiber bundles were used as the raw material; the single filament of the carbon fiber had a diameter of 7 μm, and was composed of microcrystalline graphite lamellar structures, wherein the 3-dimensional size of the microcrystal was from 15 to 50 nm, and the orientation of the microcrystalline graphite lamellae was 90% with respect to the fiber axial direction; the electrolyte solution was a 0.5 M ammonium carbonate solution, and the cathode was a 100 cm$^2$ nickel chip; a constant voltage was controlled at 40 V, and the working current density varied in a range of 1 to 20 A/cm$^2$; the graphene (oxide) quantum dots obtained were 1- to 2-layer thick, and had a particle-size distribution of 7 to 15 nm; the solution of graphene (oxide) quantum dots obtained above was freeze dried to obtain a sponge-like solid graphene (oxide) quantum dots; hydrazine hydrate was added to the solution of graphene (oxide) quantum dots obtained above to obtain reduced GQDs, which had a carbon/oxygen ratio increased from the 3:1 before reduction to 20:1 after reduction. The graphene (oxide) quantum dots were prepared at a yield of 95%.

Example 8

Example 8 differs from Example 7 mainly in that: a constant-current controlling mode was used, the working current density was 15 A/cm$^2$, and the voltage varied in a range of 30 to 50 V; the graphene (oxide) quantum dots obtained were 1- to 2-layer thick, and had a particle-size distribution of 5 to 10 nm, a pre-reduction carbon/oxygen ratio of 9:1, and a preparation yield of 98%.

Example 9

Example 9 differs from Example 6 mainly in that: 100 M55J 3K graphite carbon fiber bundles were used as the raw material; the single filament of the carbon fiber had a diameter of 5 μm, and was composed of microcrystalline graphite lamellar structures, wherein the 3-dimensional size of the microcrystal was from 30 to 80 nm, and the orientation of the microcrystalline graphite lamellae was 99% with respect to the fiber axial direction; the electrolyte solution was 0.2 M sulfuric acid, and the cathode was a 200 cm$^2$ TA2 titanium screen; a constant-current controlling mode was used, the working current density was 25 A/cm$^2$, and the voltage varied in a range of 50 to 80 V; the graphene (oxide) quantum dots obtained were 1- to 2-layer thick, and had a particle-size distribution of 15 to 25 nm, a pre-reduction carbon/oxygen ratio of 15:1, and a preparation yield of 96%.

Example 10

Example 10 differs from Example 6 mainly in that: 220 HM110 4K pitch-based carbon fiber bundles were used as the raw material; the single filament of the carbon fiber had a diameter of 10 μm, and was composed of microcrystalline graphite lamellar structures, wherein the 3-dimensional size of the microcrystal was from 50 to 100 nm, and the orientation of the microcrystalline graphite lamellae was 98% with respect to the fiber axial direction; the electrolyte solution was a 1.0 M sodium sulfate solution, and the cathode was a 50-cm$^2$ titanium-based IrO$_2$-coated screen electrode; a constant-current controlling mode was used, the working current density was 10 A/cm$^2$, and the voltage varied in a range of 20 to 50 V; the graphene (oxide) quantum dots obtained were 1- to 2-layer thick, and had a particle-size distribution of 3 to 7 nm, a pre-reduction carbon/oxygen ratio of 5:1, and a preparation yield of 93%.

Example 11

Example 11 differs from Example 10 mainly in that: the electrolyte solution was a mixed solution of 1.0 M sodium sulfate and 0.1 M sulfuric acid; a constant-current controlling mode was used, the working current density was 3 A/cm$^2$, and the voltage varied in a range of 10 to 20 V; the graphene (oxide) quantum dots obtained were 2- to 4-layer thick, and had a particle-size distribution of 30 to 50 nm, a pre-reduction carbon/oxygen ratio of 2:1, and a preparation yield of 90%.

Example 12

The graphene (oxide) quantum dots obtained in Examples 6, 8 and 10 were irradiated in a solution with an excitation UV light having a wavelength of 365 nm, and showed blue, green, and yellow fluorescence, respectively (which may be related to the particle-size distribution of the graphene (oxide) quantum dots).

The invention claimed is:
1. A method for preparing graphene oxide by cutting an end face of a 3-dimensional carbon-based material by electrochemical oxidation, comprising the steps of:
connecting a first piece of a 3-dimensional carbon-based material as a first electrode and a second piece of a 3-dimensional carbon-based material or inert material as a second electrode to the two electrodes of a DC power supply, respectively, wherein an end face of at least the first electrode serves as a working face and is positioned in contact and parallel with the liquid surface of an electrolyte solution;
then electrifying the first electrode and the second electrode for electrolysis, during which a working zone for the end face serving as the working face is located between -5 mm below and 5 mm above the liquid surface of the electrolyte solution; and
intermittently or continuously controlling the end face within the working zone, such that the graphite lamella on the end face of the at least one piece of the 3-dimensional carbon-based material is expansion-exfoliated and cut into graphene oxide by electrochemical oxidation, which is dispersed in the electrolyte solution to obtain a graphene oxide-containing electrolyte solution.

2. The method according to claim 1, wherein when the end face of the first electrode serves as the working face and is positioned in contact and parallel with the liquid surface of the electrolyte solution, the second electrode is fully or partially immersed in the electrolyte solution.

3. The method according to claim 1, wherein the second electrode is a piece of a 3-dimensional carbon-based material, and wherein the end face of the first electrode and the end face of the second electrode both serve as working faces and are positioned in contact and parallel with the liquid surface of the electrolyte solution, and wherein the first and second electrodes are of the same or different materials.

4. The method according to claim 1, wherein the 3-dimensional carbon-based material includes one of, or a combination of more than one of, graphite sheets, paper, boards, filaments, tubes, and rods made from natural or artificial graphite, carbon fiber bundles, or carpets, cloth, paper, ropes, boards, and tubes woven with carbon fiber bundles.

5. The method according to claim 1, wherein the end face of the first electrode which serves as the working face and is positioned in contact and parallel with the liquid surface of the electrolyte solution is a macroscopic surface at an angle of 60° to 90° with respect to one of the two-dimensional orientations of a microscopic graphite lamella of the 3-dimensional carbon-based material of the first electrode.

6. The method according to claim 1, wherein the electrochemical oxidation is implemented such that an end face of only one piece of a 3-dimensional carbon-based material either always serves as the anode working face or alternately serves as the anode or cathode working face, the working voltage of the DC power supply during electrolysis is not higher than 80 V, and the working current density with respect to the end face is from +(1 to 300) or ±(1 to 300) A/cm2, wherein the symbol "+" indicates the anode current density, and the symbol "±" indicates the current density of the alternating anode and cathode, wherein during the alternating cycles of electrolysis, the working current densities of the alternating anode and cathode is the same or different.

7. The method according to claim 1, wherein the electrochemical oxidation is implemented such that an end face of one piece of a 3-dimensional carbon-based material and an end face of the other piece of a 3-dimensional carbon-based material both serve as working faces and the two end faces each alternately serve as an anode or cathode working face, a working voltage of the DC power supply during electrolysis is not higher than 100 V, and the a working current density with respect to each end face is ±(1 to 300) A/cm$^2$, wherein the symbol "±" indicates the current density of the anode and cathode, wherein during alternating cycles of electrolysis, the working current densities of the anode and cathode are the same or different.

8. The method according to claim 1, comprising the steps of:
connecting a bundle-like carbon fiber serving as an anode and an inert electrode serving as a cathode to the positive and negative electrodes of a DC power supply, respectively;
immersing the inert electrode in an electrolyte solution, wherein the working face of the carbon fiber anode consists of an aligned tip face of the carbon fiber, and the tip face of the carbon fiber is positioned in contact and parallel with the liquid surface of the electrolyte solution before electrification;
then starting electrification, during which the working zone for the tip face of the carbon fiber is located between -5 mm below and 5 mm above the liquid surface of the electrolyte solution; and
intermittently or continuously controlling the tip face of the carbon fiber within the working zone, such that a microcrystalline graphite lamella on the tip face of the carbon fiber is expansion-exfoliated and cut into graphene quantum dots by electrochemical oxidation, which are dissolved in the electrolyte solution to obtain a solution of graphene quantum dots.

9. The method according to claim 8, wherein the carbon fiber includes one of, or a combination of more than one of, polyacrylonitrile-based carbon fibers, pitch-based carbon fibers, rayon-based carbon fibers, and graphite fibers.

10. The method according to claim 8, wherein the carbon fiber consists of microcrystalline graphite lamellae, the 3-dimensional size of the microcrystalline graphite lamellae is from 10 to 100 nm, the orientation of the microcrystalline graphite lamellae is not less than 60% with respect to the axial direction of the fiber, and the carbon fiber is an electro-conductive carbon fiber obtained by high-temperature carbonization, with the diameter of a single filament in the bundle being 1 to 15 μm.

11. The method according to claim 8, wherein the working voltage of the DC power supply is not higher than 80 V, a working current density with respect to the tip face of the carbon fiber is 1 to 30 A/cm$^2$, and the DC power supply is controlled in a constant-voltage mode or a constant-current mode.

12. The method according to claim 8, wherein the electrolyte solution is a solution having an ion-conducting ability and having conductivity not less than 10 mS/cm.

13. The method according to claim 8, further comprising the step of:
separating the solution of graphene quantum dots by a physical and/or chemical method to remove the electrolyte(s) and impurities therefrom, so as to obtain a solution containing graphene quantum dots in water or an organic solvent or graphene quantum dots in a colloidal or solid form,
and/or the step of:
subjecting the solution of graphene quantum dots to vacuum filtration and/or dialysis treatment to further narrow down the particle-size distribution of the product;
and/or the step of:
subjecting the graphene quantum dots to one or more treatments of liquid-phase chemical reduction, electrochemical reduction, thermal reduction, UV-radiation-induced reduction, microwave reduction, active-metal reduction, and gas-phase reduction, to further increase the carbon/oxygen atomic ratio.

14. The method according to claim 1, wherein the electrolyte solution is a solution having an ion-conducting ability and having conductivity not less than 10 mS/cm.

15. The method according to claim 1, further comprising the step of:
separating the graphene oxide-containing electrolyte solution by a physical and/or chemical method to remove the electrolyte(s) and impurities therefrom, so as to obtain a solution containing graphene oxide in water or an organic solvent or graphene oxide in a colloidal or solid form;

and/or the step of:
subjecting the graphene oxide-containing electrolyte solution to vacuum filtration and/or dialysis treatment to further narrow down the particle-size distribution of the product;
and/or the step of:
subjecting the graphene oxide to one or more treatments of liquid-phase chemical reduction, electrochemical reduction, thermal reduction, UV-radiation-induced reduction, microwave reduction, active-metal reduction, and gas-phase reduction, to further increase the carbon/oxygen atomic ratio.

\* \* \* \* \*